United States Patent
Marica

(10) Patent No.: US 10,514,106 B2
(45) Date of Patent: Dec. 24, 2019

(54) POPPET VALVE WITH VARIABLE DAMPENER AND ELASTICALLY SUPPORTED GUIDE

(71) Applicant: National Oilwell Varco, L.P., Houston, TX (US)

(72) Inventor: Adrian Marica, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 801 days.

(21) Appl. No.: 14/255,772

(22) Filed: Apr. 17, 2014

(65) Prior Publication Data

US 2014/0312257 A1    Oct. 23, 2014

Related U.S. Application Data

(60) Provisional application No. 61/813,221, filed on Apr. 18, 2013.

(51) Int. Cl.
  *F16K 15/02*    (2006.01)
  *F04B 39/10*    (2006.01)
  (Continued)

(52) U.S. Cl.
  CPC .......... *F16K 15/026* (2013.01); *E21B 21/01* (2013.01); *E21B 21/10* (2013.01);
  (Continued)

(58) Field of Classification Search
  CPC ...... F16K 15/026; F16K 15/063; F16K 47/00; F16K 1/54; E21B 21/10; F04B 39/1013;
  (Continued)

(56) References Cited

U.S. PATENT DOCUMENTS 2,163,472 A    6/1939   Shimer
2,289,946 A *  7/1942   Weatherhead, Jr. ........................ F16K 15/026
                                                137/514.3

(Continued)

FOREIGN PATENT DOCUMENTS

EP    2299150 A1    3/2011
GB    2492909 B     1/2013
(Continued)

OTHER PUBLICATIONS

PCT/US2014/034563 International Search Report and Written Opinion dated Aug. 19, 2014 (15 p.).

(Continued)

*Primary Examiner* — Craig J Price
*Assistant Examiner* — Andrew J Rost
(74) *Attorney, Agent, or Firm* — Conley Rose, P.C.

(57) ABSTRACT

A valve assembly for operation within a valve body of a pump includes an axial centerline, a poppet guide having a stem, and a poppet slidingly coupled to the poppet guide so that the poppet and the poppet guide define an internal cavity. The valve assembly also includes a flexible poppet guide mounting system coupled to the poppet guide and the poppet and includes a variable-area flow restrictor in fluid communication with the internal cavity. The flexible poppet guide mounting system is configured to support the poppet guide and the poppet for lateral and axial movement of the poppet guide and the poppet relative to the axial centerline. The poppet is movable relative to the poppet guide to adjust the volume of the internal cavity.

36 Claims, 11 Drawing Sheets

(51) Int. Cl.
*F04B 53/10* (2006.01)
*E21B 21/01* (2006.01)
*E21B 21/10* (2006.01)

(52) U.S. Cl.
CPC .......... *F04B 39/1013* (2013.01); *F04B 53/10* (2013.01); *Y10T 137/7935* (2015.04)

(58) Field of Classification Search
CPC ............... F04B 53/10; Y10T 137/7935; Y10T 137/785; Y10T 137/7851; Y10T 137/7923; Y10T 137/7932; Y10T 137/7933; Y10T 137/7937
USPC ............ 251/324; 137/543.21, 469, 477, 476, 137/475, 474, 540, 543, 543.15, 543.17, 137/514, 514.3, 536, 542, 543.19
See application file for complete search history.

(56) References Cited

U.S. PATENT DOCUMENTS

| | | | |
|---|---|---|---|
| 3,066,700 A | 12/1962 | Mercier | |
| 3,537,518 A * | 11/1970 | Sullivan | E21B 21/10 137/515.7 |
| 3,845,784 A * | 11/1974 | Sullivan | E21B 21/10 137/515 |
| 4,074,612 A | 2/1978 | Miller | |
| 4,228,820 A | 10/1980 | Deminski | |
| 4,817,739 A | 4/1989 | Jeter | |
| 4,911,196 A * | 3/1990 | Kemp | F16K 15/026 137/220 |
| 4,979,721 A * | 12/1990 | Gilbert | F16K 27/0209 137/515.5 |
| 5,501,280 A | 3/1996 | Brisco | |
| 5,931,191 A * | 8/1999 | Taube | F16K 17/30 137/504 |
| 6,328,542 B1 | 12/2001 | Serafin et al. | |
| 6,536,467 B2 | 3/2003 | Wu et al. | |
| 6,536,476 B2 | 3/2003 | Ueno et al. | |
| 7,168,440 B1 | 1/2007 | Blume | |
| 7,185,671 B2 * | 3/2007 | Duex | F16K 15/066 137/454.6 |
| 7,726,335 B2 | 6/2010 | Doble | |
| 8,033,917 B2 | 10/2011 | Prill et al. | |
| 2002/0012595 A1 | 1/2002 | Kouno et al. | |
| 2004/0234404 A1 | 11/2004 | Vicars | |
| 2006/0202150 A1 | 9/2006 | Johnson | |
| 2007/0267068 A1 | 11/2007 | Daigre | |
| 2010/0147403 A1 | 6/2010 | Bresnahan | |
| 2010/0288959 A1 * | 11/2010 | Vicars | F16K 15/063 251/324 |
| 2013/0015385 A1 | 1/2013 | Marica | |

FOREIGN PATENT DOCUMENTS

| | | |
|---|---|---|
| RU | 2180709 C1 | 7/1993 |
| SU | 1830122 A3 | 7/1993 |

OTHER PUBLICATIONS

PCT/US2012/042660 International Search Report and Written Opinion dated Jan. 16, 2013 (17 p.).
U.S. Office Action dated Mar. 26, 2013; U.S. Appl. No. 13/183,299 (9 p.).
Response to Office Action dated Mar. 26, 2013; U.S. Appl. No. 13/183,299; Response dated Jul. 26, 2013 (18 p.).
U.S. Final Office Action dated Sep. 12, 2013; U.S. Appl. No. 13/183,299 (7 p.).
Response to Final Office Action dated Sep. 12, 2013; U.S. Appl. No. 13/183,299; Response filed Nov. 12, 2013 (14 p.).
Advisory Action dated Nov. 21, 2013; U.S. App. No. 13/183,299 (3 p.).
Supplemental Response to Final Office Action dated Sep. 12, 2013 and Response to Advisory Action dated Nov. 21, 2013; U.S. Appl. No. 13/183,299; Response filed Dec. 10, 2013 (9 p.).
U.S. Notice of Allowance dated Dec. 23, 2013; U.S. Appl. No. 13/183,299 (6 p.).
Russian Office Action dated Oct. 17, 2017, and English translation, for Application No. 2015144563 filed Apr. 17, 2014.

* cited by examiner

POPPET VALVE WITH VARIABLE DAMPENER AND ELASTICALLY SUPPORTED GUIDE

CROSS-REFERENCE TO RELATED APPLICATIONS

This application claims the benefit of U.S. provisional patent application Ser. No. 61/813,221 filed Apr. 18, 2013, and entitled "Poppet Valve with Variable Dampener and Elastically Supported Guide," which is hereby incorporated herein by reference in its entirety.

STATEMENT REGARDING FEDERALLY SPONSORED RESEARCH OR DEVELOPMENT

Not applicable.

BACKGROUND

The disclosure relates generally to systems and methods for reducing the creation of pulsations in a fluid passing through a valve.

To form an oil or gas well, a bottom hole assembly (BHA), including a drill bit, is coupled to a length of drill pipe to form a drill string. The drill string is then positioned adjacent the earth or inserted downhole, where drilling commences. During drilling, drilling fluid, or "mud," is circulated down through the drill string to lubricate and cool the drill bit as well as to provide a vehicle for removal of drill cuttings from the borehole. After exiting the bit, the drilling fluid returns to the surface through the annulus formed between the drill string and the surrounding borehole wall.

Instrumentation for taking various downhole measurements and communication devices are commonly mounted within the drill string. Many such instrumentation and communication devices operate by sending and receiving pressure pulses through the annular column of drilling fluid maintained in the borehole.

Mud pumps are commonly used to deliver the drilling fluid to the drill string during drilling operations. Many conventional mud pumps are reciprocating pumps, having one or more piston-cylinder assemblies driven by a crankshaft and hydraulically coupled between a suction manifold and a discharge manifold. Each piston-cylinder assembly has a piston housed within a cylinder. A suction valve positioned between the cylinder and the suction manifold is operable to control the flow of drilling fluid from the suction manifold into the cylinder. Likewise, a discharge valve positioned between the cylinder and the discharge manifold is operable to control the flow of drilling fluid from the cylinder to the discharge manifold.

During operation of the mud pump, the piston is driven to reciprocate within the cylinder. As the piston moves to expand the volume within the cylinder, the discharge valve is closed, and drilling fluid is drawn from the suction manifold through the suction valve into the cylinder. After the piston reverses direction, the volume within the cylinder decreases, the pressure of drilling fluid contained with the cylinder increases, the suction valve closes, and the now-pressurized drilling fluid is exhausted from the cylinder through the discharge valve into the discharge manifold. While the mud pump is operational, this cycle repeats, often at a high cyclic rate, and pressurized drilling fluid is continuously fed to the drill string at a substantially constant rate.

Many conventional suction and discharge valves are poppet valves, each such valve having a poppet that is movable relative to a valve seat between a seated position, wherein the poppet engages the valve seat to prevent fluid flow through the valve, and an unseated position, wherein the poppet is disengaged from the valve seat and fluid may pass through the valve. When moving between the seated and unseated positions, it is common for the poppet to shiver. As used herein, the expression "shiver" refers to the unstable movement of the poppet caused at least in part by forces exerted on the poppet from fluid passing around the poppet through the valve.

Shivering creates pulsations in the drilling fluid that may disturb the downhole communication devices and instrumentation by degrading the accuracy of measurements taken by the instrumentation and hampering communications between downhole devices and control systems at the surface. Over time, the pulsations may also cause fatigue damage to the drill string pipe and other downhole components. Moreover, when the poppet is proximate the valve seat, shivering results in repeated contact between the poppet and the valve seat. Over time, repeated impact of the poppet against the valve seat causes wear to each component that shortens their service life.

SUMMARY

In some embodiments, a valve assembly for operation within a valve body of a pump includes an axial centerline, a poppet guide having a stem, a poppet slidingly coupled to the poppet guide and receiving the poppet guide stem, wherein the poppet and the poppet guide define an internal cavity, a flexible poppet guide mounting system coupled to the poppet guide and the poppet and configured to support the poppet guide and the poppet for lateral and axial movement of the poppet guide and the poppet relative to the axial centerline, and a variable-area flow restrictor in fluid communication with the internal cavity, wherein the poppet is movable relative to the poppet guide to adjust the volume of the internal cavity. The poppet may include a poppet body having a poppet head and an annular seal groove in the poppet head, and an elastic seal disposed within the seal groove, the seal comprising a first annular protrusion that extends beyond the seal groove and an annular recess adjacent the first annular protrusion. The seal may include a second annular protrusion, and wherein the annular recess is disposed between the first and second annular protrusions. In some embodiments, the variable-area flow restrictor includes a spring coupled adjacent the hollow poppet forming a portion of a fluid passage between the internal cavity and an outer surface of the valve assembly. The spring may be coupled between the poppet and the poppet guide. In some embodiments, the valve assembly further includes a fluid passage between the internal cavity and an outer surface of the valve assembly to provide the fluid communication, and the variable-area flow restrictor is configured to adjust a flow area of the fluid passage thereby providing a variable flow area for a first fluid flow leaving the internal cavity. The variable-area flow restrictor may be configured to provide a fixed flow area for a second fluid flow entering the internal cavity.

In some embodiments, a valve assembly for operation within a valve body of a pump includes an axial centerline, a poppet guide, a flexible poppet guide mounting system engaging the poppet guide and configured to elastically support the poppet guide and elastically respond to lateral and axial movement of the poppet guide relative to the axial centerline, and a poppet slidingly coupled to the poppet guide and movable with the poppet guide. The flexible poppet guide mounting system may comprise a plurality of extending support members coupled to the poppet guide and extending radially and axially from the poppet guide. The poppet guide mounting system may further comprise a poppet guide nut having a plurality of channels receiving the plurality of extending support members, wherein the nut is threadingly received by the poppet guide. The extending support members may extend around a portion of the poppet. The extending support members may extend axially in two directions from a region where the extending support members couple to the poppet guide. The valve assembly may include a retainer with a retainer recess into which the poppet guide extends, and a clearance between the retainer and the poppet guide enabling movement of the poppet guide about the axial centerline. The valve assembly may further include a supporting spring disposed within the retainer recess, and a support ring disposed within the retainer recess adjacent the supporting spring, wherein the poppet guide is disposed against the support ring enabling movement of the poppet guide about and along the axial centerline. The valve assembly may include a snap ring coupled to the retainer adjacent the support ring and opposite the supporting spring. The valve assembly may further include a base plate between the supporting spring and the end of the retainer recess. The valve assembly may further include a set screw threadingly received by a hole passing through the end of the retainer recess, wherein the set screw is configured to urge the base plate away from the end of the retainer recess and to cause the base plate to apply pressure against the supporting spring and the support ring to urge the poppet guide away from the end of the retainer recess. Further, the snap ring may limit the axial travel of the support ring in a direction away from the end of the retainer recess. Also, a ledge between the first and second recess portions of the retainer recess may limit the axial travel of the support ring and the poppet guide in a direction toward the end of the retainer recess. In some embodiments, the valve assembly includes a fluid passage extending from the poppet recess through a variable-area flow restrictor, wherein the fluid passage is in fluid communication with an outer surface of the valve assembly, and wherein the variable-area flow restrictor is configured to adjust a flow area of the fluid passage.

In some embodiments, a valve assembly for operation within a valve body of a pump includes a poppet guide having a stem, a hollow poppet receiving the poppet guide stem therein, wherein the poppet and the poppet guide define an internal cavity, and a variable-area flow restrictor in fluid communication with the internal cavity, wherein the hollow poppet is movable relative to the poppet guide to adjust the volume of the internal cavity. The valve assembly may include a fluid passage extending from the internal cavity through the variable-area flow restrictor, wherein the fluid passage is in fluid communication with an outer surface of the valve assembly, and wherein the variable-area flow restrictor is configured to adjust a flow area of the fluid passage. The variable-area flow restrictor may include a retention ring attached to the valve assembly. The variable-area flow restrictor may further include a regulating spring having an end adjacent the retention ring. The variable-area flow restrictor may further include a movable ring disposed between the regulating spring and an inner contact surface of the valve assembly and being in fluid communication with the internal cavity, wherein the variable-area flow restrictor is disposed adjacent the hollow poppet and the poppet guide stem, and wherein the regulating spring biases the movable ring towards the inner contact surface of the valve assembly. In some embodiments, the valve assembly includes a second variable-area flow restrictor in fluid communication with the internal cavity and comprising a poppet spring disposed within the hollow poppet and surrounding the poppet guide, the poppet spring biasing the hollow poppet in a direction away from the poppet guide.

In some embodiments, a pump includes a valve body, valve cavity disposed in the valve body, a first valve assembly disposed within the valve cavity, the first valve assembly including a poppet guide having an elongate stem extending axially from a base, a hollow poppet slidingly receiving the poppet guide stem therein, wherein the poppet and the poppet guide define an internal cavity, and a flow restrictor providing a variable-area for fluid communication between the internal cavity and the valve cavity, wherein the hollow poppet is movable relative to the poppet guide to adjust the volume of the internal cavity. In some embodiments, the pump further includes a second valve assembly co-axially aligned with the first valve assembly and disposed within the same valve cavity.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments of the disclosure, reference will now be made to the accompanying drawings in which.

NOTATION AND NOMENCLATURE

Figure 1:
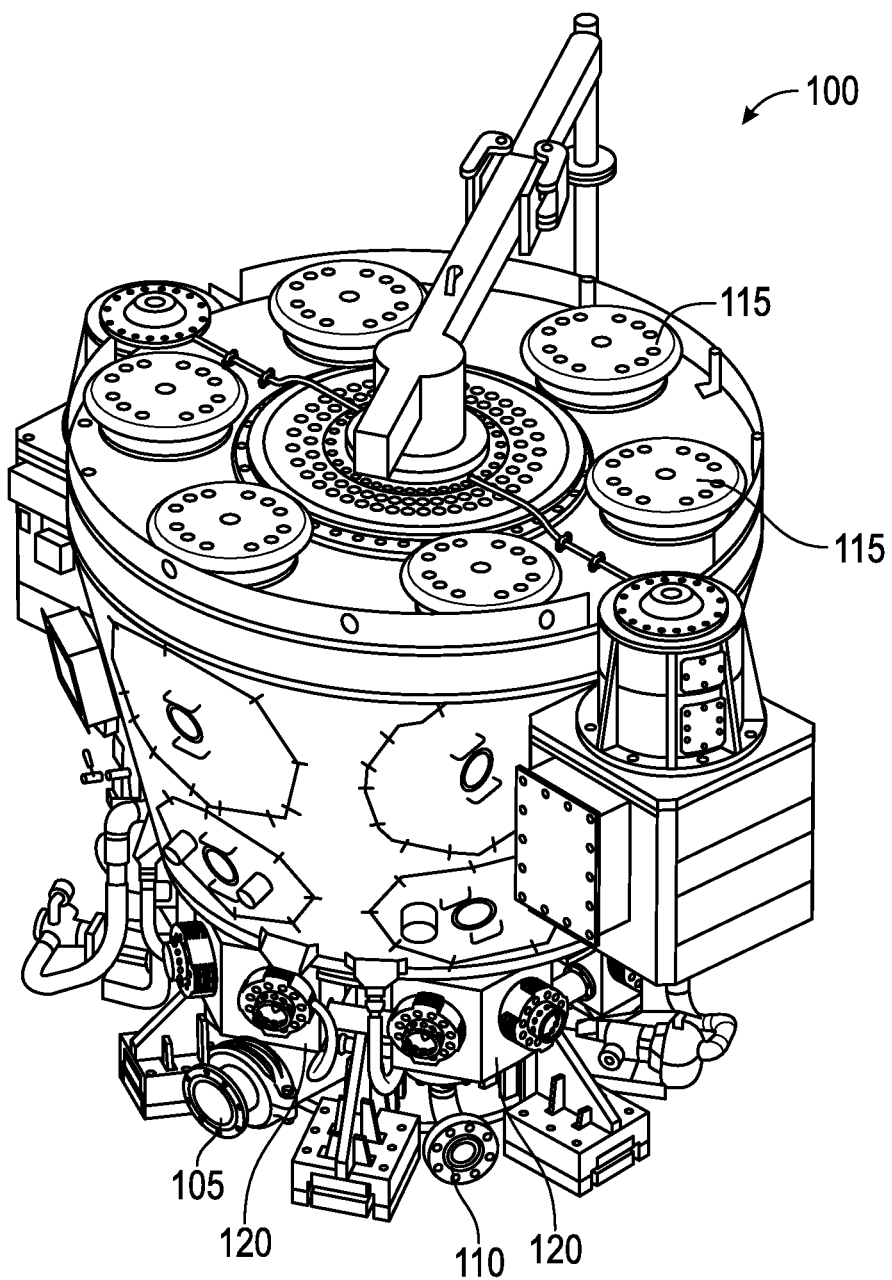
FIG. 1 is a perspective view of a pump including a plurality of valves in accordance with the principles disclosed herein.

The following description is directed to exemplary embodiments of a poppet valve assembly for use in a in a fluid pump. These embodiments are not to be interpreted or otherwise used as limiting the scope of the disclosure, including the claims. One skilled in the art will understand that the following description has broad application, and the discussion of any embodiment is meant only to be exemplary of that embodiment, and is not intended to suggest in any way that the scope of the disclosure, including the claims, is limited to that embodiment.

The drawing Figures are not necessarily to scale. Certain features and components disclosed herein may be shown exaggerated in scale or in somewhat schematic form, and some details of conventional elements may not be shown in the interest of clarity and conciseness. In some of the Figures, in order to improve clarity and conciseness of the Figure, one or more components or aspects of a component may be omitted or may not have reference numerals identifying the features or components that are identified elsewhere. In addition, like or identical reference numerals may be used to identify common or similar elements.

The terms "including" and "comprising" are used herein, including in the claims, in an open-ended fashion, and thus should be interpreted to mean "including, but not limited to . . . ." Also, the term "couple" or "couples" is intended to mean either an indirect or direct connection. Thus, if a first component couples or is coupled to a second component, the connection between the components may be through a direct engagement of the two components, or through an indirect connection that is accomplished via other intermediate components, devices and/or connections. The recitation "based on" means "based at least in part on." Therefore, if X is based on Y, X may be based on Y and any number of other factors.

Further, the terms "axial" and "axially" generally mean along or parallel to a central or longitudinal axis. The terms "radial" and "radially" generally mean perpendicular to the central or longitudinal axis, the terms are consistent with their commonly understood meanings with regard to a cylindrical coordinate system.

Any reference to a relative direction with respect to an object, for example "up", "upward," "left," "leftward," "down", "lower", and clock-wise, is made for purpose of clarification and pertains to the orientation as shown. If the object were viewed from another orientation, it may be appropriate to described direction using an alternate term.

DETAILED DESCRIPTION

Referring now to FIG. 1, there is shown a pump 100 including a plurality of valves in accordance with the principles disclosed herein. The pump 100 is operable to pressurize a working fluid, such as but not limited to drilling mud, to a desired pressure. The working fluid is drawn from a suction manifold (not shown) through a pump inlet 105 into the pump 100, pressurized by the pump 100, and discharged from the pump 100 through a pump outlet 110 into a discharge manifold (not shown).

In the illustrated embodiment, the pump 100 is a hex pump, having six piston-cylinder assemblies 115 driven by a common axial cam (not shown). Each piston-cylinder assembly 115 is coupled to a valve block 120, which may also be called a valve body. Further, each piston-cylinder assembly 115 includes a piston movably disposed within a cylinder and coupled to the axial cam. During operation of the pump 100, the axial cam rotates, causing the pistons to translate, or reciprocate, within their respective cylinders.

Figure 2A:
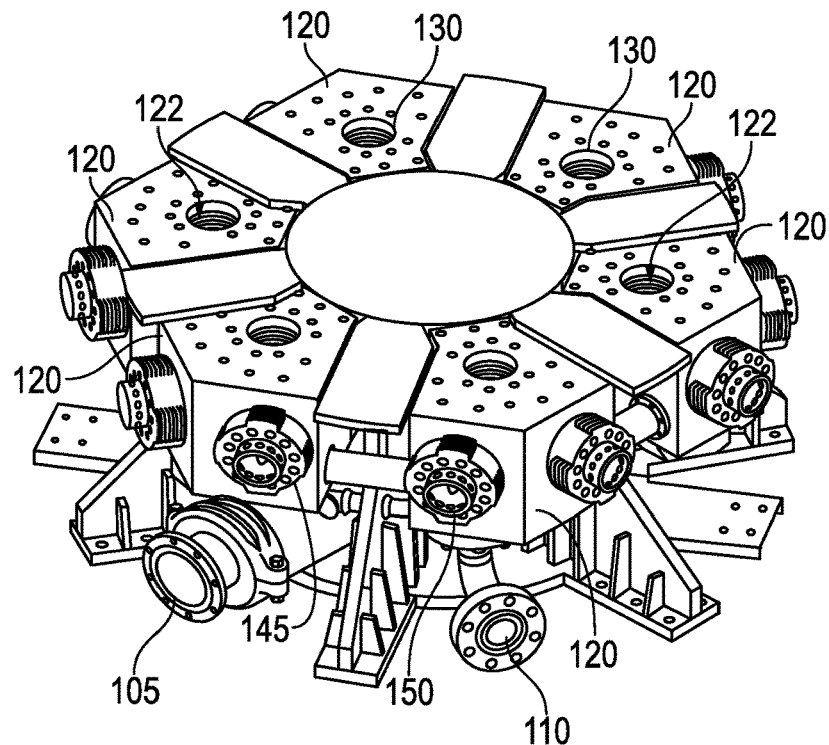
FIGS. 2A and 2B are perspective views of the pump of FIG. 1 in the absence of the piston-cylinder assemblies, illustrating the valve blocks in accordance with the principles disclosed herein.
Figure 2B:
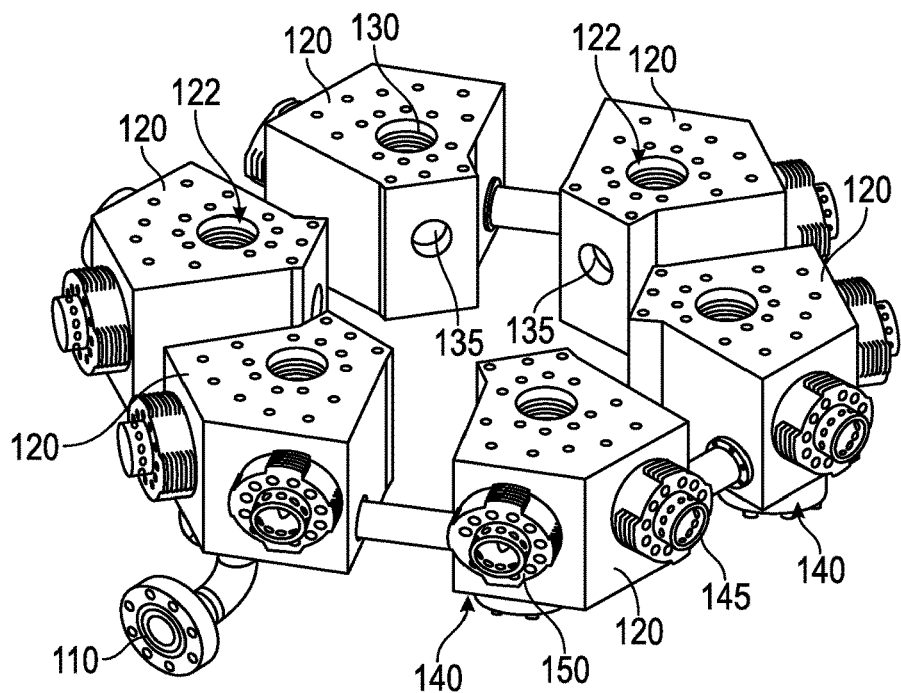

Turning to FIGS. 2A and 2B, which depict the pump 100 in the absence of the piston-cylinder assemblies 115, each valve block 120 has an internal cavity 122 having portions characterized by differing diameters. The valve block 120 also has a cylinder port 130 in fluid communication with the cylinder of the associated piston-cylinder assembly 115, a suction port 135 in fluid communication with the pump inlet 105, and a discharge port 140, located on the base of the valve block 120, in fluid communication with the pump outlet 110. The cylinder port 130, suction port 135, and discharge port 140 are periodically in fluid communication with the various portions of internal cavity 122, depending on the cyclical action of suction and discharge valve modules, which will be described subsequently. Internal cavity 122 or portions of internal cavity 122 may also be called a valve cavity.

Figure 3:
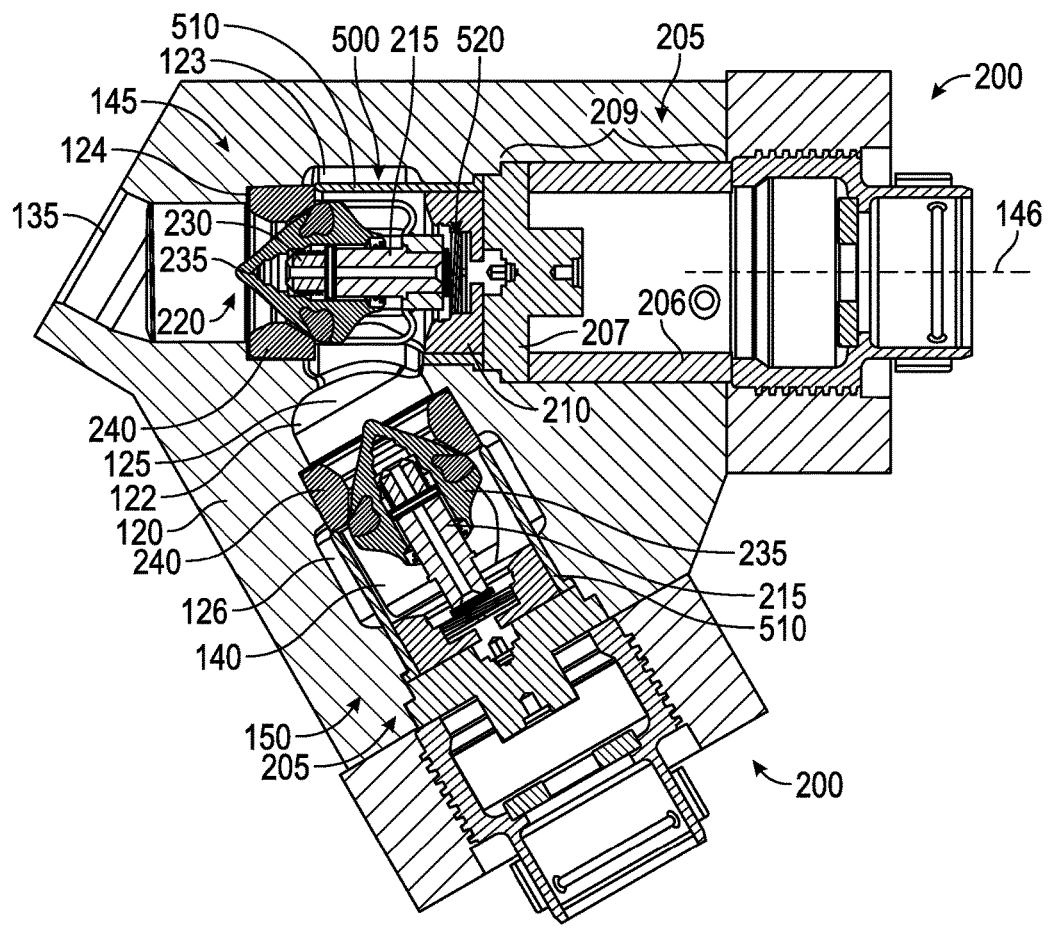
FIG. 3 is a cross-sectional view of a valve block, illustrating the suction and discharge valve assemblies disposed therein in accordance with the principles disclosed herein.

Referring to FIG. 3, the pump 100 further includes a suction valve assembly 145 and a discharge valve assembly 150 disposed within two different portions or valve cavities 123, 126 (respectively) of the internal cavity 122 of each valve block 120. A third portion of the internal cavity 122 is configured as a pumping chamber 125 disposed between the suction valve assembly 145, the discharge valve assembly 150, and the cylinder port 130. Pumping chamber 125 is in fluid communication with cylinder port 130 and the corresponding piston-cylinder assembly 115. The suction valve assembly 145 is operable to control the flow of working fluid from the pump inlet 105 into valve cavity 123 and the pumping chamber 125. The discharge valve assembly 150 is operable to control the flow of pressurized working fluid from the pumping chamber 125 to valve cavity 126, discharge port 140, and the pump outlet 110.

FIG. 3 depicts a cross-section of one valve block 120, bisecting the suction valve assembly 145 and the discharge valve assembly 150 disposed therein along their axial centerlines. As previously described, the suction valve assembly 145 is disposed within the valve block internal cavity 122 to control the flow of working fluid from the pump inlet 105 through the suction port 135 of the valve block 120 into the pumping chamber 125. The discharge valve assembly 150 is disposed within valve block internal cavity 122 to control the flow of pressurized working fluid from the pumping chamber 125 through the discharge port 140 (located behind the discharge valve assembly 150 in this view) of the valve block 120 to the pump outlet 110. In the illustrated embodiment, the suction valve assembly 145 and the discharge valve assembly 150 are substantially identical, both in structure and in operation. In the interest of brevity, only the suction valve assembly 145 will be described in detail. However, its description is also applicable to the discharge valve assembly 150.

The suction valve assembly 145 includes an axial centerline 146, a valve cover assembly 200, a retainer assembly 205, a poppet guide 215 held within valve block internal cavity 122 by assemblies 200, 205, a poppet sub-assembly 220 slidingly received on poppet guide 215, and a valve seat 240 distal the valve cover assembly 200. Poppet sub-assembly 220 includes a poppet 235 and a resilient member received within poppet 235. In FIG. 3, the resilient member is an annular poppet spring 230 and, more specifically, a wave spring. The retainer assembly 205 includes an extension sleeve 206, a cap 207, and an engagement member 210. The retainer assembly 205 has an enlarged end portion 209 slidingly disposed within an enlarged outer end of internal cavity 122, defined relative to an inner portion of the internal cavity 122, and enlarged end portion 209 seats against an inner shoulder in the valve block 120 to limit the axial position of the retainer assembly 205 relative to the valve block 120. The end portion 209 includes extension sleeve 206 and a portion of cap 207. Valve cover assembly 200 is coupled to or mounted adjacent the end portion 209 of the retainer assembly 205. The retainer assembly 205 may also be simply be called the "retainer," and in some embodiments, the retainer assembly is replaced by a single piece. In an exemplary embodiment, discharge valve 150 includes a retainer assembly 205 that lacks an extension sleeve 206.

Figure 4:
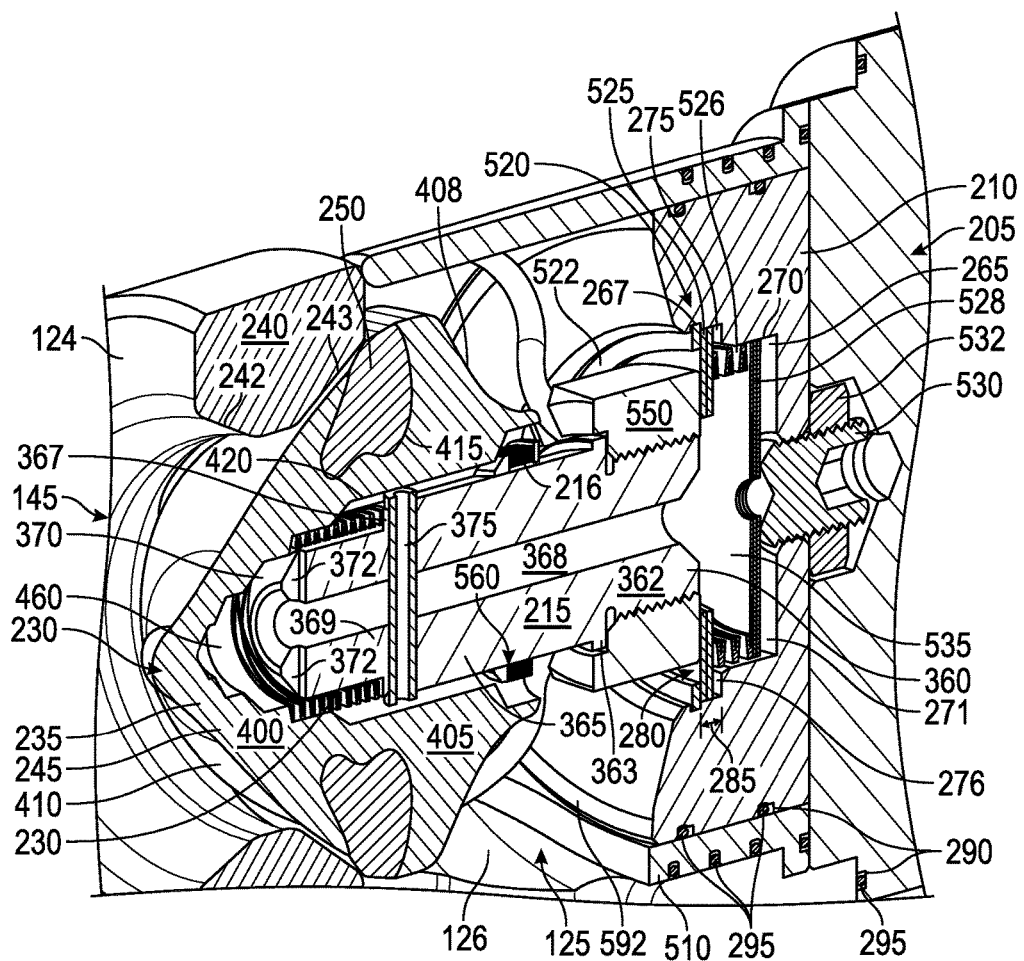
FIG. 4 is a perspective axial cross-sectional view of the suction valve assembly of FIG. 3 in accordance with the principles disclosed herein.

Referring next to FIG. 4, which is an enlarged view of the suction valve assembly 145 shown as a perspective, axial cross-section, the engagement member 210 at the inner end of the retainer assembly 205 (FIG. 3) includes a multi-featured recess 265 having a diameter that varies with its depth. The recess 265 may be said to have one or more reduced diameter portions. The recess 265 is adapted to receive a flexible pedestal assembly 520 and an end of poppet guide 215. The pedestal assembly 520 includes a support ring 525 and a supporting spring 526. The deepest portion 270 of the recess 265, which will also be called the first recess portion, has a deepest end 271 and a diameter adapted to receive the supporting spring 526. The shallow portion 275 of the recess 265, which will also be called the second recess portion, has a larger diameter than the deepest portion 270, forming an annular, radially-extending surface or ledge 276 between first and second recess portions 270, 275. The shallow portion 275 is adapted to receive the support ring 525 with negligible radial clearance therebetween, as shown, and to receive the poppet guide 215, leaving both radial clearance 280 and axial clearance 285 between the poppet guide 215 and the retainer assembly 205. Thus, supporting spring 526 is positioned proximal the deepest end 271 of the retainer recess 265, and support ring 525 is positioned within the retainer recess 265 adjacent the supporting spring 526 and distal the deepest end 271. The poppet guide 215 is disposed against and supported by the support ring 525, which is biased by the supporting spring in a direction away from the retainer assembly 205.

Clearances 280, 285 enable limited movement of the poppet guide 215 relative to the axial centerline 146 and the retainer assembly 205. As will be discussed below, the poppet 235 slidingly couples to the poppet guide 215. The poppet 235 is both axially movable with respect to poppet guide 215 and is movable together with the poppet guide 215. Poppet guide 215 and the coupled poppet 235 together may translate laterally, as allowed by radial clearance 280 or may translate axially as allowed by axial clearance 285 and the compressibility of supporting spring 526. The poppet guide 215 and the poppet 235 may pivot about axial centerline 146 if a force acting on guide 215 and poppet 235 causes an uneven compression of supporting spring 526. Thus a movement of the poppet guide 215 and the poppet 235 may involve axial translation, lateral translation (which includes radial translation), pivoting, or a combination of these movements relative to the axial centerline 146. In this manner, pedestal assembly 520 is configured as a flexible poppet guide mounting system for poppet guide 215. In various embodiments, the supporting spring 526 extends from the deepest portion 270 into shallow portion 275 of the recess 265.

A retention member is coupled to the retainer assembly 205 and disposed adjacent or within the retainer recess 265 and the poppet guide 215. In the example shown, the retention member is a snap ring 522 held within an annular slot 267 proximal the outer edge of retainer recess 265 in engagement member 210. Thus, the snap ring 522 is disposed adjacent support ring 525, opposite the supporting spring 526 and limits the axial travel of the support ring 525 in a direction away from the deepest end 271 of the retainer recess, opposing the axial extension force of the supporting spring 526.

In the example of FIG. 4, pedestal assembly 520 also includes a base plate 528 positioned between the supporting spring 526 and the deepest end 271 of the retainer recess 265. The base plate 528 is configured to compress supporting spring 526 against the movable support ring 525 and fixed snap ring 522 by means of a set screw 530 threadingly received in an centrally positioned hole at the end of the retainer engagement member 210, i.e. passing through the deepest end of the retainer recess 265. A keeper nut 533 is positioned on the opposite side of retainer engagement member 210 to exert an axial tension on set screw 530 to impede relative rotation. The tension of supporting spring 526 and therefore the force exerted by pedestal assembly 520 against the poppet guide 215 are variable, depending on the axial position of set screw 530. This adjustability of the exerted force improves the flexibility and agility of pedestal assembly 520. Thus, the set screw 530 is configured to urge the base plate 528 away from the deepest end 271 of the retainer recess 265 and to cause the base plate 528 to apply pressure against the supporting spring 526 and the support ring 525 to urge the poppet guide 215 away from the deepest end 271. Consequently, the poppet guide 212 and the poppet spring 230 urge the poppet 235 toward the valve seat 240.

A fluid cavity 535 is formed within the retainer recess 265 and is further defined by the base 360 of the poppet guide 215, and by support ring 525 of pedestal assembly 520. In the example embodiment, the fluid cavity 535 encompasses at least a portion of the supporting spring 526, and the base plate 528 forms an adjustable boundary for fluid cavity 535.

The ledge 276 formed between the smaller diameter deepest portion 270 and the larger diameter shallow portion 275 of retainer recess 265 limits the axial movement of the support ring 525 and the poppet guide 215 in the direction toward the deepest end 271 and thereby limits the compression of supporting spring 526. In various other embodiments, multi-featured recess 265 is replaced by a recess having a single portion with a constant diameter, so that the compression of supporting spring 526 and the axial movement of the poppet guide 215 are not limited by a ledge 276 as described but are limited at least by deepest end 271.

To prevent the loss of working fluid from the pumping chamber 125, the retainer assembly 205 further includes one or more annular grooves 290 formed in its outer surface and a sealing member 295 seated in each. In some embodiments, the sealing member 295 is an O-ring. The sealing members 295 sealingly engage the interior surface of the valve block 120 bounding the pumping chamber 125 to limit or prevent working fluid from passing between the suction valve assembly 145 and the valve block 120.

Continuing to reference FIG. 4, the poppet guide 215 includes an outer surface 216, a poppet guide base 360, and an elongate poppet guide stem 365 extending axially from base 360. Distal the guide base 360, the guide stem 365 includes an annular ledge 367 along outer surface 216, forming an end section 369 having a smaller diameter than the central portion of stem 365. The end section 369 of stem 365 terminates at a tapered or chamfered head 370. The guide base 360 includes a threaded shaft 362 and a flange 363 at the intersection of the guide stem 365 and the threaded shaft 362. The shaft 362 threadingly receives a poppet guide nut 550 as a member of guide base 360 on poppet guide 215. The guide base 360 is seated against the support ring 525 of the pedestal assembly 520. The stem 365 is received within the poppet 235 with negligible radial clearance therebetween and aligns the poppet 235 such that the axial centerline of the poppet 235 aligns with the axial centerline of the stem 365. When the poppet 235 pivots relative to the axial centerline of the valve seat 240, for instance in response to off-center contact with the valve seat 240, the poppet guide 215 pivots similarly due to engagement between the stem 365 and the poppet 235. In some instances, axial or lateral translational movement of poppet 235 results in a corresponding translation of poppet guide 215 as facilitated by pedestal assembly 520 and radial clearance 280 and axial clearance 285, which were described previously.

The poppet guide 215 also includes an axial flowbore 368 extending through the guide base 360, the guide stem 365, and the tapered head 370, giving poppet guide 215 a generally tubular shape. Radial slots 372 in the tapered head 370 aid with fluid communication between axial flowbore 368, outer surface 216, and pumping chamber 125. A pin 375 extends radially through the central portion of the guide stem 365 between flange 363 and annular ledge 367. The pin 375 partially blocks the axial flowbore 368 to act as a fixed-area flow restrictor for fluid movement through the axial flowbore 368, potentially dampening the movement of poppet 235 relative to poppet guide 215. The axial flowbore 368 is in fluid communication with the fluid cavity 535 in the retainer recess 265.

Referring to FIG. 3 and FIG. 4, the valve seat 240 is an annular member disposed within the valve block cavity 122 in abutment with a shoulder 124 of the valve block 120. The valve seat 240 includes a converging inner surface 242 and a diverging inner surface 243. The converging surface 242 directs working fluid from the suction port 135 of the valve block 120 toward the poppet 235. The diverging surface 243 promotes the flow of the working fluid around the poppet 235 when the poppet 235 is unseated, meaning disengaged from the valve seat 240. The diverging surface 243 is also that portion of the valve seat 240 that engages the poppet 235 when the poppet 235 is seated, or engaged with the valve seat 240. Consequently, the diverging surface 243 is shaped to promote effective sealing with the poppet 235.

Figure 5:
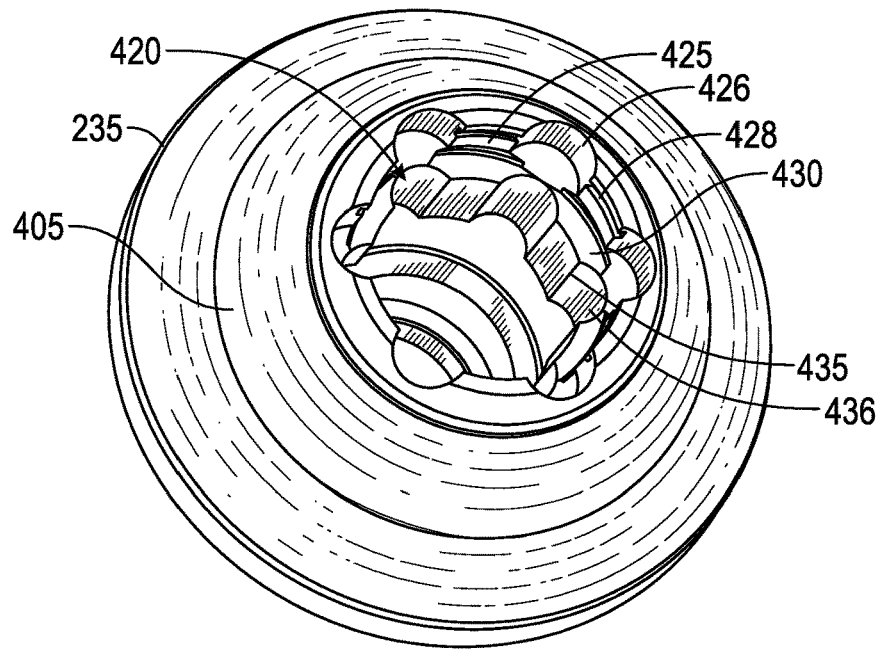
FIG. 5 is a perspective end view of the poppet of FIG. 4 in accordance with the principles disclosed herein.
Figure 6:
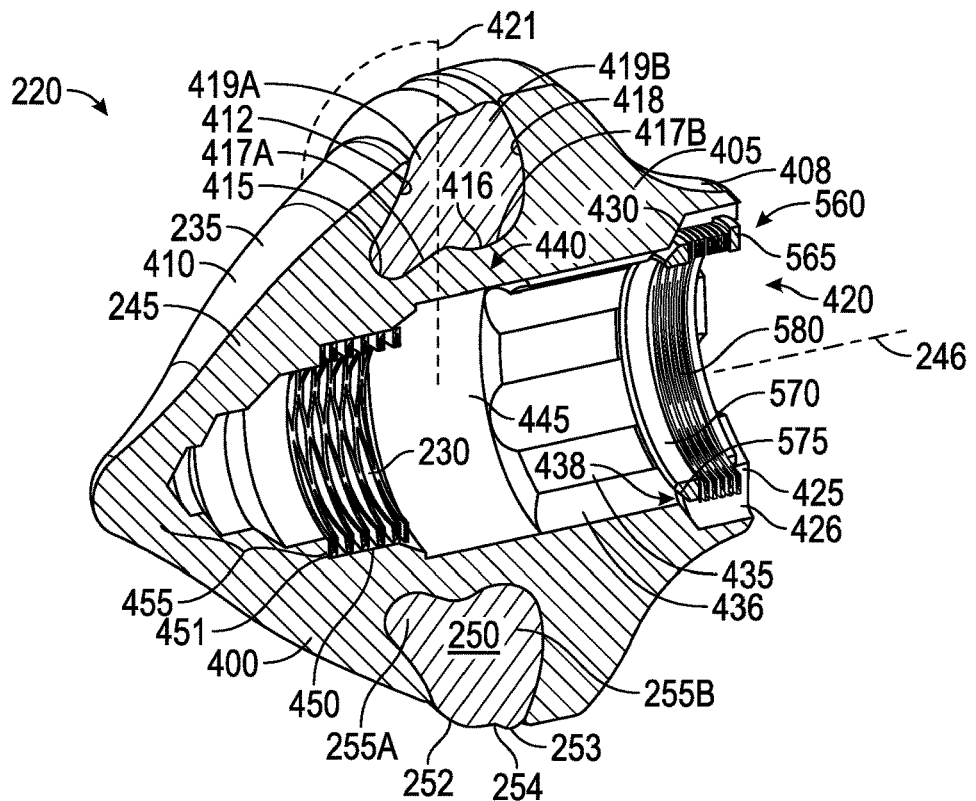
FIG. 6 is a perspective view showing a profile cross-section of the poppet sub-assembly of FIG. 4 in accordance with the principles disclosed herein.

As shown in FIG. 5 and FIG. 6, the poppet 235 includes a poppet body 245 having an axial centerline 246 and a multi-lobular seal 250 disposed about body 245. In some embodiments, the poppet body 245 comprises at least one of heat treated steel and heat treated stainless steel. The poppet body 245 has a hollow head 400 and an annular stem or tail end 405 extending therefrom. Head 400 has a somewhat conically-shaped outer surface 410 and a contoured surface 412 intersecting and extending radially inward from surface 410. Contoured surface 412 forms a circumferential seal groove 415. The outer surface 410 is shaped to promote effective sealing with the valve seat 240 and to enable smooth fluid flow around the poppet 235 when unseated with minimal turbulence creation. In the exemplary embodiment shown in FIG. 6, the diverging surface 243 of valve seat 240 is substantially flat or has a slight curvature when viewed in cross-section. The portion of outer surface 410 of head 400 that is configured for direct or indirect engagement with surface 243 has a similar shape. However, these surfaces 410, 243 may have greater or less curvature in other embodiments.

The groove 415 receives the seal 250 therein. The contoured surface 412 of groove 415 includes a protrusion 416 that extends radially toward outer surface 410 and includes two concave lobular regions or lobes 417A, B, extending generally away from outer surface 410 of head 400. The contoured surface 415 also has a curved, "bowl-shaped" or concave side wall 418 facing axially and opposite the direction that tail end 405 extends from head 400. Side wall 418 may also be called a side portion. Concave side wall 418 is adjacent lobular region 417B. The curvature of side wall 418 may promote beneficial movement of seal 250 during engagement with valve seat 240. The volume of groove 415 has an inner portion 419A defined in part by lobular region 417A and an outer portion 419B defined in part by lobular region 417B. Portions 422, 425 are defined by a radial plane 421 that substantially bisects the protrusion 416. The groove 415 is sized such that the outer portion 419B has a volume exceeding that of the inner portion 419A to promote beneficial movement of seal 250 during engagement with valve seat 240. In some embodiments, the volume of the outer portion 419B is 4% greater than that of the inner portion 419A.

Referring to FIG. 6, the seal 250 comprises a resilient or elastic material, such as but not limited to polyurethane and/or rubber. The dimensions of the seal 250 are selected such that when the poppet 235 displaces toward the valve seat 240, such as to close the suction valve assembly 145, the seal 250 contacts the valve seat 240 before any portion of the poppet body 245. In the exemplary embodiment, the seal 250 has a first radially-extending protrusion, lobe, or bulge, 252, a second radially extending protrusion, lobe, or bulge, 253, and a reduced diameter, or recessed, portion 254 located between bulges 252, 253. The exterior bulges 252, 253 and recessed portion 254 are adjacent the outer surface 410 of head 400 and extend circumferentially around annular seal 250 and may be described as annular protrusions or bulges. Seal 250 also includes two protrusions, lobes, or bulges 255A, B opposite the bulges 252, 253. Bulge 255A is received within lobe 417A of grove 415, and bulge 255B is received within lobe 417B. Exterior bulges 252, 253 and interior bulges 255A, B extend around annular seal 250 in a circumferential direction and therefore may be described as being annular protrusions or bulges. The bulge 252, which extends radially beyond the poppet head 400 and seal groove 415, is the portion of the seal 250 that makes the initial contact with the valve seat 240, as shown. Initial contact by the seal 250 with the valve seat 240 enables the seal 250 to compress to a degree and enables the movement of the poppet 235 to be slowed before the poppet head 400 engages the valve seat 240, both of which comprise material that is more rigid than that of the seal 250. Slowing the poppet 235 in this manner before the poppet head 400 engages the valve seat 240 reduces the impact force between the valve seat 240 and the poppet head 400. This, in turn, reduces wear to these components 240, 400 and enables them to have longer service lives. In some embodiments, second bulge 253 also extends beyond radially beyond the poppet head 400 and seal groove 415.

Continued movement of the poppet 235 against the valve seat 240 causes the seal 250 to further compress or move within the groove 415. Compression and movement of the seal 250 is promoted by the shape of the seal 250, in particular a reduced diameter portion 254, and the shape of the seal groove 415.

Continuing to reference the poppet 235 in FIG. 6, tail end 405 of body 245 includes an outer surface 408, having concave curvature that extends toward head 400 and is visible in the profile cross-section that is shown. The convex outer surface 408 promotes the smooth flow of the working fluid to reduce turbulence after the fluid passes the annular passage between valve seat 240 and poppet head 400 when poppet 235 is not seated. The convex outer surface 408 is in fluid communication with pumping chamber 125.

As shown in FIG. 5 and FIG. 6, hollow poppet 235 includes a multi-featured recess 420 having multiple portions and extending inward from tail end 405. In particular, poppet recess 420 includes a first or outer portion 425 having a set of first axial channels 426 and a circumferential groove 428, a generally frustoconical face 430 initiating a second or transitional portion 435, which has a smaller inner diameter than outer portion 425 and has a set of second axial channels 436. Each of the second axial channels 436 is circumferentially aligned with a first axial channel 426, and intersects both the frustoconical face 430 and the aligned first axial channel 426, promoting fluid communication between channels 426, 436. Thus, frustoconical face 430 is shared by or intersects outer portion 425, axial channels 426, 436, and transitional portion 435; therefore, frustoconical face 430 will also be called mutual face 430. In various embodiments, the set of first axial channels 426 may include one, two, or any other practical number of channels, and the set of second axial channels 426 may include one, two, or any other practical number of channels. The inner diameter of transitional portion 435 is suited to slidingly receive the central portion of guide stem 365 between flange 363 and annular ledge 367 (FIG. 4).

The multi-featured recess 420 further includes a multiple sectioned base portion 440 adjoining the transitional portion 435. The base portion 440 includes a third, intermediate portion 445 extending inward from transitional portion 435, includes a fourth, spring-receiving portion 450 having an annular face 451 and a smaller diameter than intermediate portion 445, and includes a fifth, innermost portion 455 extending from the inner diameter of annular face 451. In the embodiment shown, the innermost portion 455 includes multiple sections of varying diameters, some of which taper. The initial section of innermost portion 455 is cylindrical and is adapted to receive head 370 and the proximal end of guide stem 365. The annular face 451 is an example of an internal face of recess 420.

Referring to FIG. 6, in addition to poppet 235 and spring 230, poppet sub-assembly 220 also includes a variable-area flow restrictor 560 received and retained within the outer portion 425 of poppet recess 420. The variable-area flow restrictor 560 includes a retention ring 565 held in the circumferential groove 428, a movable ring 570 having a frustoconical face 575 adjacent and facing the mutual face 430, and a regulating spring 580 positioned between retention ring 565 and an end face on movable ring 570. Thus the retention ring 565, movable ring 570, and the regulating spring 580 are axially aligned. The inside diameter of movable ring 570 substantially matches the inner diameter of the transitional portion 435 of poppet recess 420. In various embodiments, regulating spring 580 is partially compressed and thus is "pre-loaded" with a compression force when installed as described. The regulating spring 580 biases frustoconical face 575 of movable ring 570 toward contact with mutual face 430, forming a partial seal along the inner surface of poppet 235 in some instances. Best shown in FIG. 7, this partial seal along the inner surface of poppet 235 is interrupted at circumferentially spaced locations by one or more variable gaps 438. A gap 438 is formed at the intersection of each pair of aligned channels 426, 436 and is bounded by mutual face 430 and movable ring 570 of variable-area flow restrictor 560. In various instances, additional compression of regulating spring 580 causes movable ring 570 to be displaced from mutual face 430, increasing the size of the one or more gaps 438. In the embodiment shown, regulating spring 580 is a wave spring.

Figure 7:
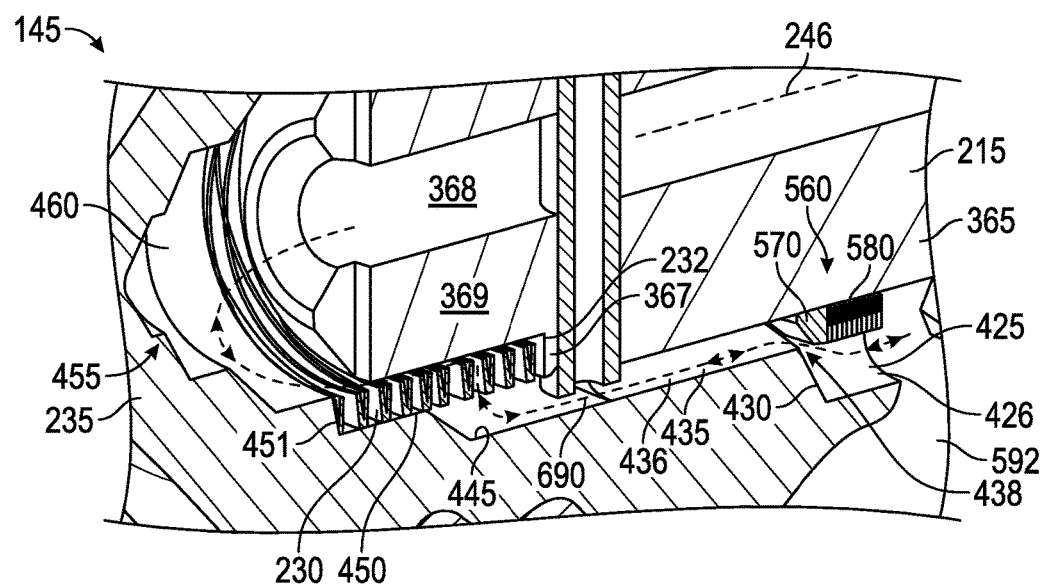
FIG. 7 is a close perspective axial cross-sectional view of the suction valve assembly of FIG. 4 in accordance with the principles disclosed herein.

As shown in FIG. 4 and FIG. 7, the recess 420 of poppet 235 receives the poppet guide stem 365 therein, defining an internal cavity 460 between the poppet guide stem 365 and the inner surface of the poppet 235. The variable-area flow restrictor 560 and the inner diameter of transitional portion 435 of poppet recess 420 slidingly receive and engage a length of guide stem 365 between flange 363 and annular ledge 367 with the guide stem 365 extending beyond the tail end 405 of poppet 235. The annular ledge 367 faces the inside surface of the poppet recess 420. The end section 369 of guide stem 365 slidingly receives the inner surface of annular poppet spring 230, which extends axially between annular ledge 367 and the internal face 451 of the poppet recess 420. Thus, poppet spring 230 is coupled adjacent to poppet 605, and is disposed and retained between poppet 605 and poppet guide 215. The poppet spring 230 and the poppet guide end section 369 are together disposed within spring-receiving portion 450 and intermediate portion 445 of poppet recess 420. In various instances, end section 369 extends into innermost portion 455 of poppet recess 420. The radial space extending from poppet guide stem 365, through poppet spring 230, and to the inner surface of intermediate portion 445 includes a radial clearance 232.

The poppet spring 230 is expandable and compressible between the annular ledge 367 of guide stem 365 and the internal face 451 of the poppet 235. Expansion and compression of the poppet spring 230 enables axial movement of the poppet 235 relative to the poppet guide 215. Further, the poppet spring 230 biases the poppet 235 to the seated position against the valve seat 240 and away from poppet guide 215. When the force exerted on the poppet 235 by working fluid upstream of the suction valve assembly 145 (i.e. fluid in suction port 135) exceeds the force exerted on the poppet 235 by the poppet spring 230 and working fluid in the pumping chamber 125, the poppet 235 moves axially toward the poppet guide 215, compressing the spring 230. Conversely, when the force exerted on the poppet 235 by working fluid upstream of the suction valve assembly 145 is less than the force exerted on the poppet 235 by the poppet spring 230 and working fluid in the pumping chamber 125, the poppet 235 moves axially away from the poppet guide 215, allowing the spring 230 to expand.

Referring to FIG. 7, the axial channels 426, 436 along the inner surface of poppet 235 enable fluid communication, e.g.

fluid flow or pressure exchange, between the pumping chamber 125 (FIG. 4) and the internal cavity 460. Regulating spring 580 and movable ring 570 are disposed between poppet 235 and poppet guide stem 365 and are slidable relative to stem 365. When the poppet 235 moves axially toward the valve seat 240 (FIG. 4) relative to the poppet guide stem 365, working fluid flows from the pumping chamber 125 into poppet 235 preferably passing through a flow path or fluid passage 590 defined by axial channels 426, variable gaps 438 (having a variable-area for fluid communication governed or provided by flow restrictor 560), axial channels 436, and the annular space between guide stem 365 and the intermediate portion 445 of poppet recess 420. The fluid passage 590 continues radially through poppet spring 230, and axially along radial clearance 232 to the internal cavity 460 within the poppet recess 420. As spring 230 compresses or expands during operation, the area available for fluid to flow through spring 230 varies; therefore, spring 230 is a variable-area flow restrictor. The fluid passage 590 is in fluid communication with axial flowbore 368 of poppet guide 215, which is in fluid communication with the fluid cavity 535 in the retainer recess 265. In various embodiments, axial flowbore 368 is considered to be a portion of fluid passage 590. It is noted that fluid passage 590 and, thus, internal cavity 460 and axial flowbore 368 are in fluid communication with a fluid zone 592 around valve assembly 145, bounded in part by the outer surface of the valve assembly 145, which includes outer surface 216 of poppet guide 215 and outer surface 408 of poppet 235. In FIG. 4, fluid zone 592 is in fluid communication with valve cavity 123 and pumping chamber 125 and, in some instances, may be considered an extension of valve cavity 123. For a discharge valve assembly 150 (e.g. FIG. 3), the surrounding fluid zone 592 is in fluid communication with the valve cavity 126 of the internal cavity 122 and with discharge port 140 and, in some instances, the corresponding fluid zone 592 may be considered an extension of valve cavity 126.

Referring again to FIG. 7, the minimized tolerance between movable ring 570 and poppet guide stem 365 restricts or inhibits the flow of fluid therebetween, causing fluid to prefer to flow through variable gaps 438. In some embodiments, fluid passage 590 includes the annular space between movable ring 570 and poppet guide stem 365, providing fluid communication in parallel with variable gaps 438.

The rate of fluid flow into or out of the internal cavity 460 of the poppet 235 through fluid passage 590 is dependent at least in part upon the number and cross-sectional size of the axial channels 426, 436 and gaps 438. The speed at which the poppet 235 responds to a pressure differential, as previously described, and moves relative to the poppet guide 215 is, in turn, dependent upon the rate of fluid into or out of the internal cavity 460. The greater the number and/or the larger the size of channels 426, 436 and gaps 438, the quicker the poppet 235 responds and moves. Conversely, the fewer the number and/or the smaller the size of channels 426, 436 and gaps 438, the slower the poppet 235 responds and moves. In other words, movement of the poppet 235 is dampened. For this reason, the suction valve assembly 145 may be described as having an integrated dampener or flow restrictor. In preferred embodiments, the number and cross-sectional size of the channels 426, 436 and gaps 438 are selected to dampen movement of the poppet 235 sufficiently to minimize the creation of pulsations in the working fluid due to poppet movement. At the same time, the number and size of the channels 426, 436 and gaps 438 are selected such that the channels 426, 436 and gaps 438 allow a sufficient flow rate in the fluid passage 590 such that poppet 235 seals against seat 240 during each cycle before any substantial amount of working fluid from pumping chamber 125 flows back into the suction port 135. In the discharge valve assembly 150, the number and size of the channels 426, 436 and gaps 438 are selected such that the channels 426, 436 and gaps 438 allow a sufficient flow rate in a corresponding fluid passage 590 such that poppet 235 seals against seat 240 during each cycle before any substantial amount of working fluid from the discharge port 140 flows back into the pumping chamber 125.

As working fluid flows into the internal cavity 460 by way of the fluid passage 590, passing the variable-area flow restrictor 560, the regulating spring 580 maintains movable ring 570 against mutual face 430 so that gaps 438 remain fixed at their smallest size. Thus, the variable-area flow restrictor 560 is configured to provide a generally constant restriction to the flow of working fluid into internal cavity 460 and thereby a generally constant restriction to the movement of the poppet 235 away from the valve guide 215 when pumping conditions encourage poppet 235 to move to engage valve seat 204, i.e. that suction valve 145 closes.

The potential for fluid movement from internal cavity 460 to pumping chamber 125 by way of the fluid passage 590 has been described. In addition, in some embodiments, a sudden movement of poppet 235 closer to poppet guide 215 may cause a pressure spike within internal cavity 460 and axial flowbore 368 sufficient to cause the fluid momentarily to push the poppet guide 215 away from the pedestal assembly 520. In such instances of hydraulic lifting, some fluid from flowbore 368 or from fluid cavity 535 (FIG. 4) may pass between poppet guide base 260 and support ring 525, entering pumping chamber 125.

Conversely, when the poppet 235 moves axially in the opposite direction, i.e. away from valve seat 240 and into greater contact with poppet guide 215, some working fluid in the internal cavity 460 is displaced by the poppet guide stem 365 and exits poppet 235. The displaced working fluid flows from the internal cavity 460 through the fluid passage 590 and into the pumping chamber 125. While leaving internal cavity 460 and poppet 235, the working fluid presses against the frustoconical face 475 of movable ring 570, potentially compressing the regulating spring 580 and separating ring 570 from mutual face 430 so that the gaps 438 enlarge variably depending on the flow rate from internal cavity 460, which depends at least in part on the rate of movement of the poppet 235 toward the valve guide 215. In turn, the rate of movement of the poppet 235 toward the valve guide 215 depends at least in part on the pressure differential or the pumping flow rate of working fluid between the suction port 135 and the pumping chamber 125. Thus, the variable-area flow restrictor 560 is configured to provide less restriction to the flow of working fluid from internal cavity 460 and, thereby, to provide less restriction to the movement of the poppet 235 toward the valve guide 215 and away from valve seat 240 when pumping conditions advocate a higher flow of working fluid from suction port 135 to pumping chamber 125. In this manner, the variable-area flow restrictor 560 is configured to change or adjust an available flow area of fluid passage 590 and to influence variably the movement of poppet 235. Therefore, variable-area flow restrictor 560 may also be called a variable integrated dampener for poppet 235. In some instances, when working fluid from within internal cavity 460 exits poppet 235 relatively slowly, the regulating spring 580 may not compress, and the gaps 438 may remain at their smallest size.

During operation of the pump 100, the pistons reciprocate within their respective cylinders. As each piston strokes back, a vacuum is drawn on the pumping chamber 125 (FIG. 3) of the valve block 120 to which the piston is coupled. Due to the pressure differential between the pumping chamber 125 and working fluid downstream of the discharge valve assembly 150, the discharge poppet 235 moves axially along the guide poppet 215 toward the valve seat 240. Movement of the discharge poppet 235 causes working fluid to be drawn through axial channels 426, 436 and gaps 438 of the discharge poppet 235 into its internal cavity 460. Due to the size and number of channels 426, 436 and gaps 438, the rate at which fluid flows into the internal cavity 460 is controlled, dampening movement of the poppet 235 in response to fluid passing over the poppet 235 and reducing the tendency for the poppet 235 to shiver or impact abruptly as it approaches the valve seat 240. When the discharge poppet 235 is proximate the valve seat 240, the seal 250 engages the valve seat 240, compressing and slowing movement of the poppet 235. Continued movement of the poppet 235 toward the valve seat 240 further compresses the seal 250 until the discharge poppet 235 is seated against the valve seat 240. The combination of the shape of the valve seat surface 243, engagement between the discharge poppet recess 420 and the discharge poppet guide stem 365, and the ability of the discharge poppet guide 215 to translate axially, to translate laterally, and to pivot, as previously described, enable centering of the discharge poppet 235 against the valve seat 240 to form a complete seal therebetween. In this manner, the discharge valve assembly 150 is closed.

Likewise, due to the pressure differential between the pumping chamber 125 (FIG. 4) and fluid upstream of the suction valve assembly 145 as each piston strokes back, the suction poppet 235 moves axially along the poppet guide 215 away from the valve seat 240. In response, some working fluid within the internal cavity 460 of the suction poppet 235 is displaced from the internal cavity 460 through the axial channels 426, 436 and gaps 438 into the pumping chamber 125. Due to the size and number of channels 426, 436 and gaps 438, the rate at which fluid flows out of the internal cavity 460 is controlled, dampening movement of the poppet 235 in response to fluid passing over the poppet 235 and reducing the tendency for the poppet 235 to shiver as it moves away from the valve seat 240. Also, as the suction poppet 235 unseats, the seal 250 expands or moves, returning to its uncompressed shape within the seal groove 415. In this manner, the suction valve assembly 145 is opened.

With the discharge valve assembly 150 closed and the suction valve assembly 145 open, working fluid passes from the suction manifold through the pump inlet 105 and the suction port 135 of the valve block 120 around the unseated suction poppet 235 to fill the pumping chamber 125, including the cylinder.

When the piston reaches the end of its stroke, the piston reverses direction and begins to stroke forward. As the piston strokes forward, fluid pressure in the cylinder and the pumping chamber increases. When the force exerted on the suction poppet 235 by fluid in the pumping chamber 125 and the suction poppet spring 230 exceeds the force exerted on the suction poppet 235 by fluid upstream of the poppet 235 in suction port 135, the suction valve assembly 145 closes in an identical manner as that described previously in regards to closing of the discharge valve assembly 150. After the suction valve assembly 145 is closed, the pumping chamber 125 ceases to receive working fluid from the suction manifold.

When the force exerted on the discharge poppet 235 by fluid in the pumping chamber 125 exceeds the force exerted on the discharge poppet 235 by fluid downstream of the poppet 235 and the discharge poppet spring 230, the discharge valve assembly 150 opens in an identical manner as that described previously in regards to opening of the suction valve assembly 145. After the discharge valve assembly 150 is open, pressurized fluid in the pumping chamber 125 flows around the discharge poppet 235 through the discharge port 140 of the valve block 120 and the pump outlet 110 into the discharge manifold. When the piston reaches the end of its stroke, it again reverses direction, and begins to stroke back, drawing a vacuum on the pumping chamber 125 and so on, as described above. While the pump 100 continues to operate, this process repeats, and pressurized working fluid is exhausted from the pump outlet 110.

As the poppet 235 of a valve assembly 145, 150 opens, it forces fluid out of the poppet's internal cavity 460 and past the variable-area flow restrictor 560. Depending on the speed of the poppet 235 relative to poppet guide 215 and rate of fluid discharge, the regulating spring 580 of the variable-area flow restrictor 560 may compress more or less, changing or adjusting the available flow area of a portion of fluid passage 590, e.g. gaps 438. When poppet 235 closes, moving toward the seat 240, regulating spring 580 expands, and in various instances, the movable ring 570 contacts the mutual face 430, limiting the flow area of fluid passage 590, e.g. gaps 438 at mutual face 420, to a minimum or a reduced flow area during refilling of internal cavity 460. Fluid passage 590 does not close mechanically but is always open, not accounting for a blockage that might occur due to contamination. Because gaps 438 remain fixed at their smallest size as the poppet valve assembly 145, 150 closes, but can enlarge as the poppet valve assembly 145, 150 opens, the speed of closure is potentially slower than the speed with which poppet valve assembly 145, 150 opens. In instances when poppet valve 235 opens and movable ring 570 moves away from the mutual face 430, the fluid passage 590 has a flow area at the mutual face 430 that is larger than the minimum or reduced flow area described in relationship with the closing of poppet valve 235.

Valve assemblies 145, 150 with integrated dampeners have been described. In the exemplary embodiments, the valve assembly has the internal cavity 460 that receives and exhausts fluid. The rate at which the fluid enters or leaves the internal cavity 460 dampens movement of the poppet 235 in response to fluid passing over the poppet 235 and reduces the tendency for the poppet 235 to shiver. The poppet 235 has the seal 250 which, during closing of the valve assembly, contacts the valve seat 240 before any portion of the poppet head 400. Subsequent compression of the seal 250 slows movement of the poppet 235 and reduces impact forces between the poppet head 400 and the valve seat 240. This, in turn, reduces wear to these components 240, 400, enabling them to have longer service lives. In the exemplary embodiment, the poppet 235 also has the seal groove 415 which is shaped to enable compression, rather than stretching, of the seal 250 during contact with the valve seat 240. This prevents fatigue damage to the seal 250. In various instances, seal 250 may also move within groove 415. The valve assembly poppet guide 215 is pivotable and translatable. This promotes centering of the poppet 235 against the valve seat 240, which enables effective sealing between these components and complete closure of the valve assembly.

Figure 8:
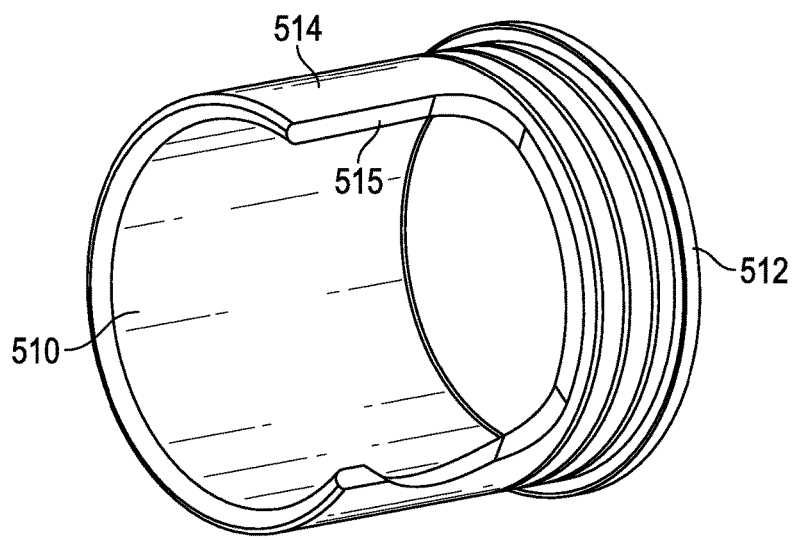
FIG. 8 is a perspective view of the sleeve of the suction valve assembly of FIG. 3 in accordance with the principles disclosed herein.

Referring again to the example of FIG. 3, suction valve assembly 145 also includes a flexible poppet guide mounting system 500 that includes the pedestal assembly 520 previously described. In various embodiments, including the embodiment of FIG. 3, poppet guide mounting system 500 further includes a generally cylindrical pumping chamber sleeve 510 and multiple extending support members 540 coupled to poppet guide 215. The sleeve 510 extends circumferentially around portions of support members 540, poppet 235, and poppet guide 215 within chamber 125. Best shown in FIG. 8, the pumping chamber sleeve 510 includes a first or flanged end 512, a second end 514, and at least one sidewall opening 515 extending from flanged end 512 and through second end 514. As shown in FIG. 3, flanged end 512 is disposed within the valve block cavity 122 in abutment with a shoulder of the valve block 120, and second end 514 is disposed adjacent the discharge end of valve seat 240, i.e. the end nearest diverging inner surface 243. The sidewall of sleeve 510 supports, i.e. limits the movement of, two or more of the extending support members 540. The sidewall opening 515 promotes the flow of working fluid from poppet 235 and chamber sleeve 510 to other regions in pumping chamber 125.

Figure 9:
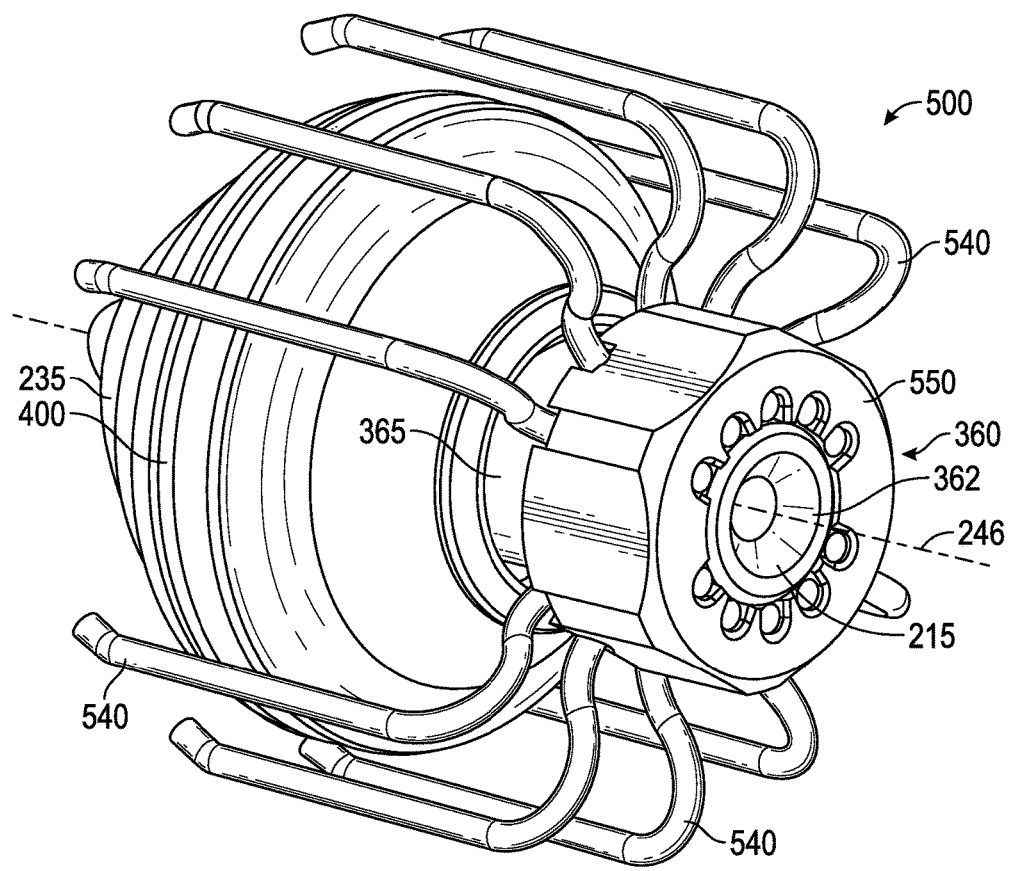
FIG. 9 is a perspective end view of the suction valve assembly of FIG. 3 in accordance with the principles disclosed herein.
Figure 10:
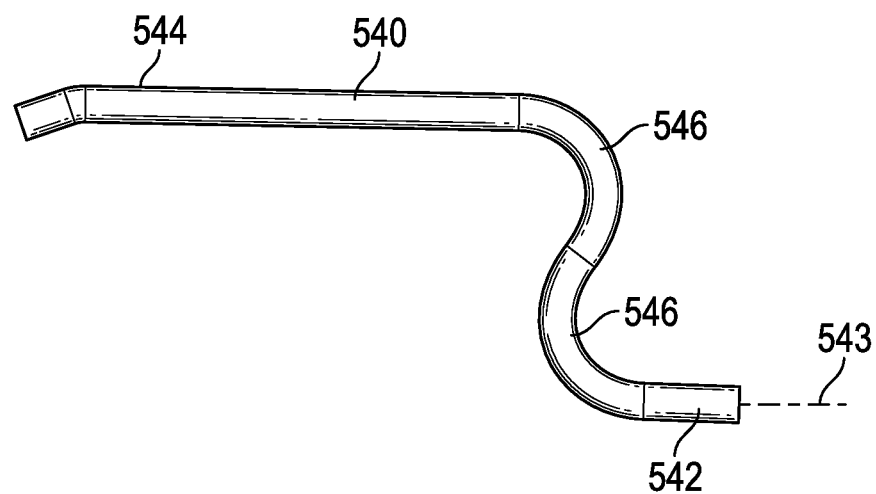
FIG. 10 is a side view of an extending support member of the suction valve assembly of FIG. 9 in accordance with the principles disclosed herein.
Figure 11:
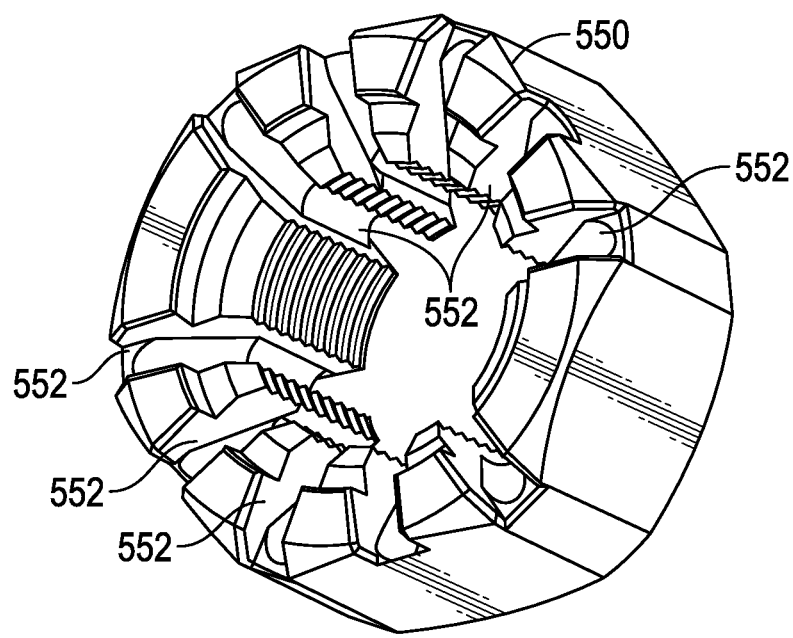
FIG. 11 is a perspective end view of the poppet guide nut of the suction valve assembly of FIG. 9 in accordance with the principles disclosed herein.

As best shown in FIG. 9, multiple extending support members 540 extend radially and axially from poppet guide 215 and are coupled by poppet guide nut 550 at guide base 360. Referring to FIG. 10, the extending support members 540 in the present example are bent rods comprising a first leg 542 having a longitudinal axis 543, a second leg 544 extending axially beyond first leg 542 in the same direction as first leg 542 extends, and two curved intermediate sections 546. Each section 546 has a smooth bend of greater than 90 degrees, but the two sections 546 are bent in opposite directions in the disclosed example, so that the second leg 544 is generally parallel to first leg 542. The second leg 544 is longer than the first leg 542 and includes an acute bend at its distal end. Although, the legs 542, 554 and intermediate sections 546 are distinguished in FIG. 10, each support member 540 may be formed from a single piece of elongate material, for example. The support members 540 are formed from resilient material, meaning members 540 can sustain some amount of bending or distortion without exceeding the elastic limit of the material so that they generally return to their original shape after such distortion. In cross-section, the support members 540 may be have any suitable shape including, for example, round, rectangular, oval, or triangular as well as solid, tubular, or porous. The first legs 542 are received within contoured channels 552 formed in poppet guide nut 550. The ends of channels 552 are shown in FIG. 9 while a more complete perspective is presented in FIG. 11. The channels 552 extend axially and radially within nut 550, providing radial and axial support for the extending support members 540. In some embodiments the support members 540 are welded or attached in another suitable manner to the poppet guide rather than being coupled by channels 552. In other embodiments, an intermediate section or sections 546 is bent equal to or less than 90 degrees. In some embodiments, second leg 544 extends axially back towards and beyond first leg 542.

As shown in FIG. 9 and FIG. 3, the ends of the second legs 544 of the support members 540 extend around a portion of poppet head 400 and embed into valve seat 240. The support members 540 are further limited in radial movement by proximity or contact of the second legs 544 with an inner surface of chamber sleeve 510. As previously discussed in reference to FIG. 4, the poppet guide 215 and the coupled poppet 235 are configured to translate laterally, to translate axially, and to pivot due to radial clearance 280, axial clearance 285, and the compressibility of supporting spring 526. The support members 540 provide poppet guide 215 and the poppet 235 additional freedom to translate laterally and axially and to pivot, even if support ring 525 and supporting spring 526 of pedestal assembly 520 do not move. If, for example, the working fluid flowing around suction valve assembly 145 were to cause the poppet guide 215 and the poppet 235 together to move laterally, axially, or pivotally relative to valve block 120, in response one or more support members 540 can be bent elastically beyond their resting configuration (FIG. 3) and would then exert axial forces, lateral forces, or pivotal forces to cause poppet guide 215 and the poppet 235 to return to their previous position or to achieve a new position that may cause poppet head 400 and seal 500 to engages valve seat 240 more advantageously. Thus, the poppet guide 215 and poppet 235 are configured to pivot, to translate axially, and to translate laterally, as aided by the various elements of poppet guide mounting system 500, enabling centering of the suction poppet 235 against the valve seat 240 to form a complete seal therebetween. Furthermore, the extending support members 540 and the poppet guide mounting system provide an elastic response or elastic support to the poppet guide 215 and the poppet 235 such that the poppet guide 215 and the poppet 235 can return to their original position or an advantageous position after being subjected to external forces.

Figure 12:
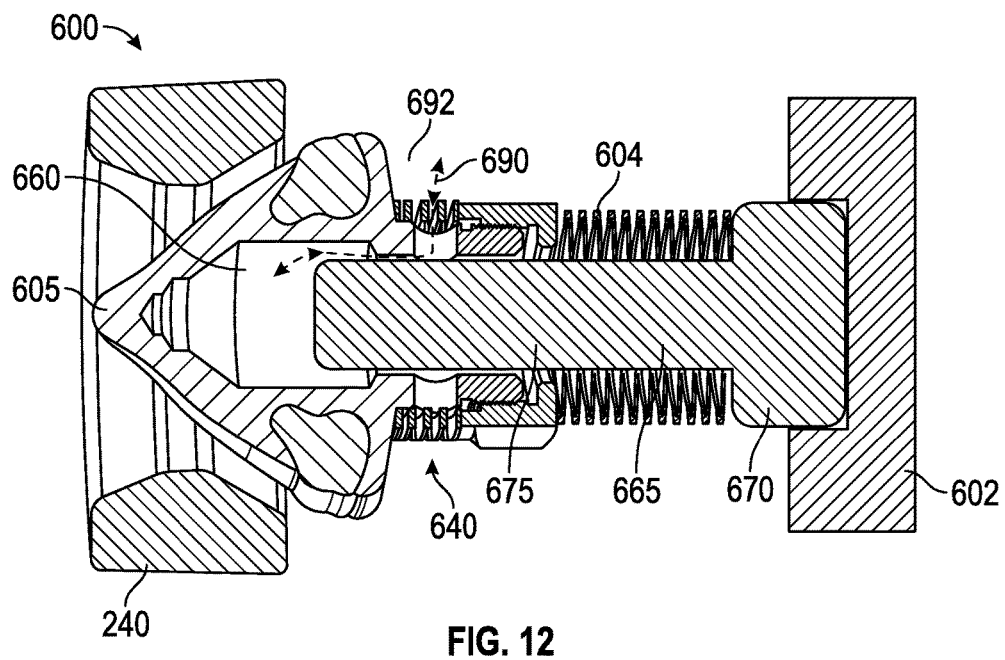
FIG. 12 is a perspective axial cross-sectional view of another embodiment of a suction valve assembly in accordance with the principles disclosed herein.

FIG. 12 presents an alternative embodiment of a poppet valve assembly. In particular, a poppet valve assembly 600 includes a hollow poppet 605, a retainer 602, a poppet guide 665, a poppet spring 604, a variable-area flow restrictor 640, and a valve seat 240. For brevity, at least retainer 602 and poppet guide 665 are shown in schematic form. The poppet guide 665 includes a guide base 670 and a solid guide stem 675 extending from base 670.

Figure 13:
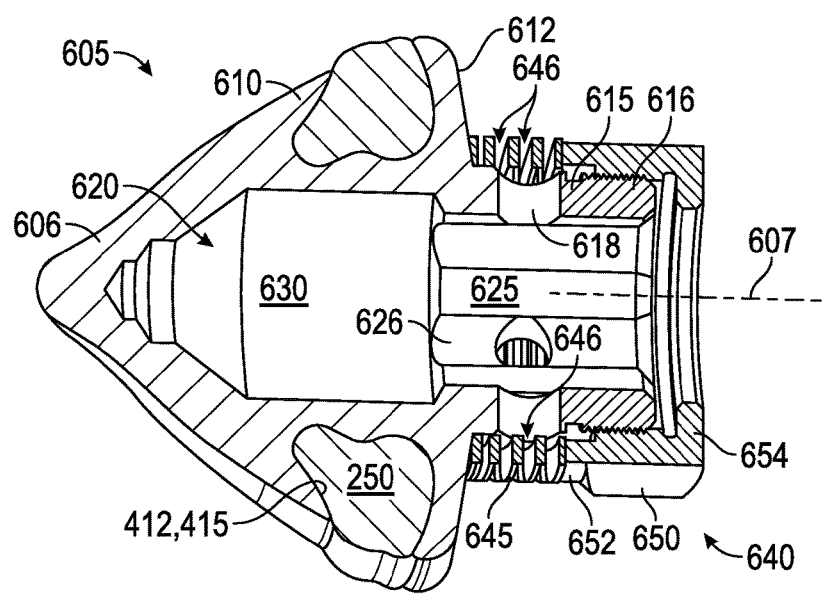
FIG. 13 is perspective axial cross-sectional view of the poppet sub-assembly of the suction valve assembly of FIG. 12 in accordance with the principles disclosed herein.

As shown in FIG. 13, the poppet 605 includes a poppet body 606 having an axial centerline 607 and a circumferential seal 250 disposed about body 606. In some embodiments, the poppet body 606 comprises at least one of heat treated steel and heat treated stainless steel. The poppet body 606 has a hollow head 610 and a tubular stem 615 extending therefrom. Head 610 has a somewhat conically-shaped outer surface 612 and a seal groove 415 intersecting surface 410. In the exemplary embodiment, the front portion of outer surface 612 is similar to outer surface 410 on poppet 235 (FIG. 6). As such, head 610 is configured to engage and seal against a valve seat 240 (FIG. 12), which is also included in the embodiment of FIG. 4 and FIG. 6. The groove 415 receives the seal 250 therein. Tubular poppet stem 615 includes a threaded tail end 616 and one or more radial ports or holes 618 extending through poppet stem 615 being disposed between threaded tail end 616 and head 610.

Poppet 605 includes a multi-featured recess 620 having multiple portions and extending inward from tubular poppet stem 615. In particular, recess 620 includes a first or outer portion 625 having one or more axial channels 626. The inner diameter of outer portion 625 is suited to slidingly receive the guide stem 675. The recess 620 also includes a multiple-sectioned base portion 630 having at least a first subsection with a larger inner diameter than the inner diameter of outer portion 625. The base portion 630 is configured to receive freely the guide stem 675. Axial channels 626 intersect and couple radial ports 618 and base portion 630.

Continuing to reference FIG. 13, a variable-area flow restrictor 640 is coupled around poppet stem 615. The variable-area flow restrictor 640 includes a regulating spring 645 and an end nut 650 having a first end 652 and a second or flanged end 654. Poppet stem 615 threadingly receives end nut 650 around tail end 616. The flanged end 654 extends radially inward. In some embodiments, the inner diameter of the flanged end 654 matches the inner diameter of recess outer portion 625. The regulating spring 645 is disposed around poppet stem 615 and axially aligned with radial ports 618, being constrained axially between the poppet head 610 and the variable position of end nut 650. Thus, spring 645 is coupled adjacent to poppet 605. The position of nut 650 is adjustable to compress or expand spring 645, decreasing or increasing the radially-extending open spaces 646 within the cylindrical wall of the spring 645. In the embodiment shown, regulating spring 645 is a wave spring.

As shown in FIG. 12, the poppet recess 620 slidingly receives the upper portion of poppet guide stem 675 therein, defining an internal cavity 660 between the poppet guide stem 675 and the inner surface of the poppet 605. A fluid passage 690 extends between internal cavity 660 and a fluid zone 692 around valve assembly 600, bounded in part by and including the outer surface of the valve assembly 600. Fluid passage 690 comprises axial channels 626, radial ports 618, and one or more of the radially-extending open spaces 646 in regulating spring 645. The poppet spring 604 is slidingly received on poppet guide stem 675 is expandable and compressible between guide base 670 and the flanged end 654 of nut 650, which is threadingly coupled to poppet 605. Therefore poppet spring 604 is expandable and compressible between the poppet guide 665 and the poppet 605. Expansion and compression of the poppet spring 604 enables axial movement of the poppet 605 relative to the poppet guide 665. Further, the poppet spring 604 biases the poppet 605 to the seated position against the valve seat 240. However, in FIG. 12, poppet 605 is shown displaced from, i.e. not contacting, valve seat 240.

Contemplating an embodiment of pump 100 having poppet valve assembly 600 installed as a suction valve, the fluid passage 690 enables fluid communication between the internal cavity 660 and the pumping chamber 125 (FIG. 4), which is represented by fluid zone 692 in FIG. 12. When the poppet 605 moves axially toward the valve seat 240 relative to the poppet guide stem 675, working fluid flows from the pumping chamber 125 through variable-area flow restrictor 640, radial ports 618, and axial channels 626 into the internal cavity 660. Conversely, when the poppet 235 moves axially in the opposite direction, some working fluid in the internal cavity 660 is displaced by the poppet guide stem 675. The displaced working fluid flows from the internal cavity 660 through the axial channels 626, radial ports 618, and variable-area flow restrictor 640 into the pumping chamber 125. The variable-area flow restrictor 640 is configured as a variable integrated dampener to influence the speed with which poppet 235 moves relative to poppet guide 665. Once end nut 650 is adjusted, the variable-area flow restrictor 640 provides equal flow area and therefore a similar restriction for fluid flow entering internal chamber 660 as for fluid flow exiting internal chamber 660 by way of the fluid passage 690.

In the example of suction valve assembly 600, the hollow poppet 605 is mated with a solid poppet guide 665, which is rigidly coupled to the retainer 602. In some other embodiments, poppet 605 and poppet guide 665 are flexibly mounted to a flexible poppet guide mounting system including the pedestal assembly 520 (FIG. 4) or the pumping chamber sleeve 510 and multiple, extending support members 540 (FIG. 9). Further, in various embodiments, poppet 605 couples to a poppet guide having a hollow core, similar to poppet guide 215.

The valve assembly 600 could also be coupled between a pumping chamber, such as pumping chamber 125, and a discharge port, such as port 140 (FIG. 2B) to perform as a discharge valve assembly. For poppet valve assembly 600 installed as a discharge valve, fluid zone 692 in FIG. 12 represents the fourth portion 126 of the internal cavity 122 in FIG. 3, in fluid communication with discharge port 140.

Figure 14:
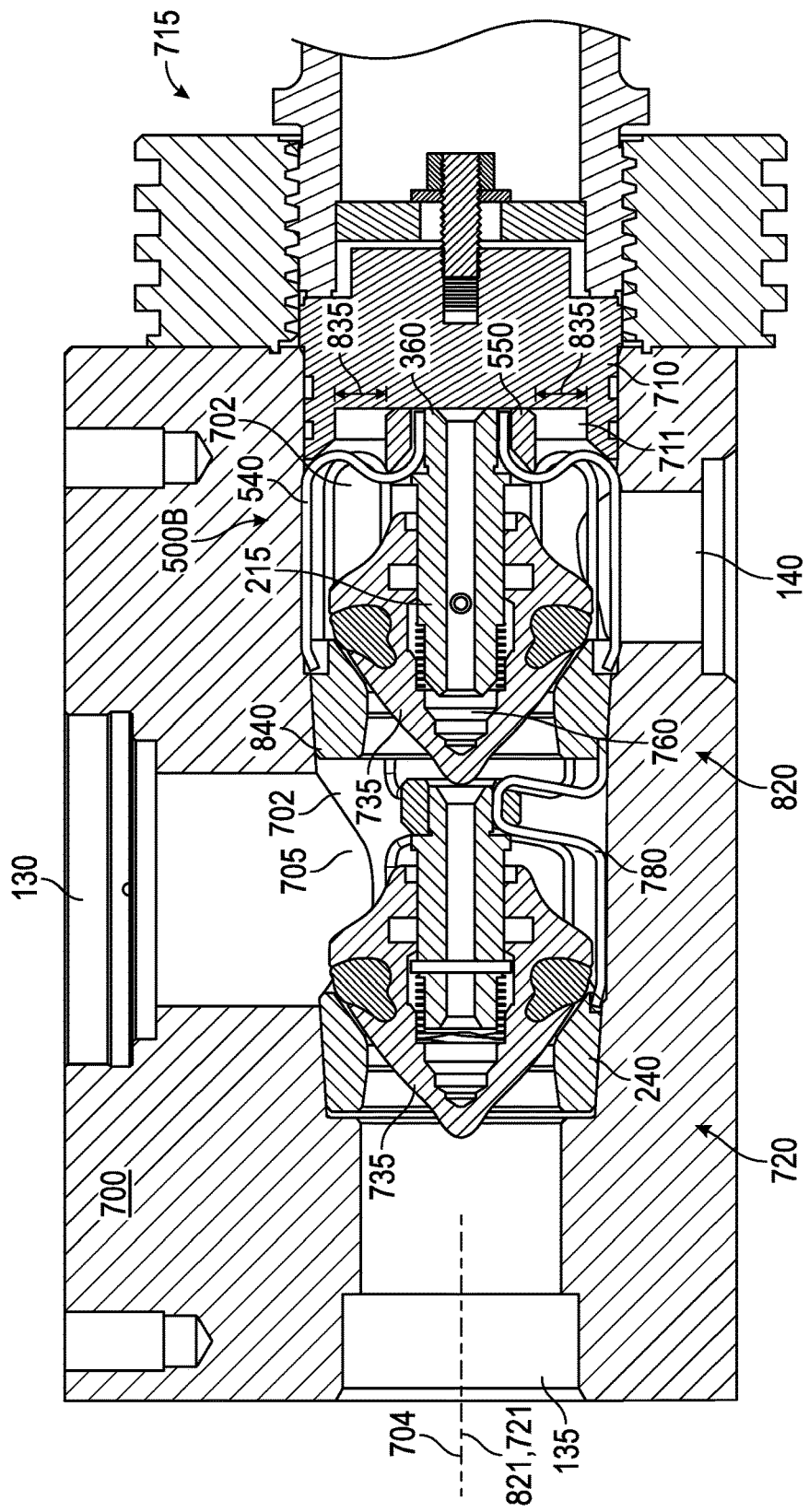
FIG. 14 is a cross-sectional view of still another embodiment of another valve block having suction and discharge valve assemblies disposed therein in accordance with the principles disclosed herein.

The cross-sectional view of FIG. 14 illustrates another embodiment of a valve block having suction and discharge valve assemblies disposed therein in accordance with the principles disclosed herein. FIG. 14 bisects the suction and discharge valve assemblies along their axial centerlines. In particular, a valve block 700, which is compatible with the pump 100 and various other pumps, has a generally cylindrical internal cavity or valve cavity 702 having an axial centerline 704 and multiple axially-space regions of differing diameters to facilitate the installation of a suction valve assembly 720 in-line, i.e. co-axially, with a discharge valve assembly 820. The co-axial alignment of the valve assemblies 720, 820 within the same cavity 702 provides a relatively compact configuration in comparison to various other valve blocks. A retainer 710 and a valve cover assembly 715 retain and seal the valve assemblies 720, 820 within the internal cavity 702. The valve block 700 also includes a cylinder port 130, a suction port 135, and a discharge port 140 that are in fluid communication with the internal cavity 702. A pumping chamber 705 includes the region of the internal cavity 702 disposed between the suction valve assembly 720, the discharge valve assembly 820, and the cylinder port 130.

Figure 15:
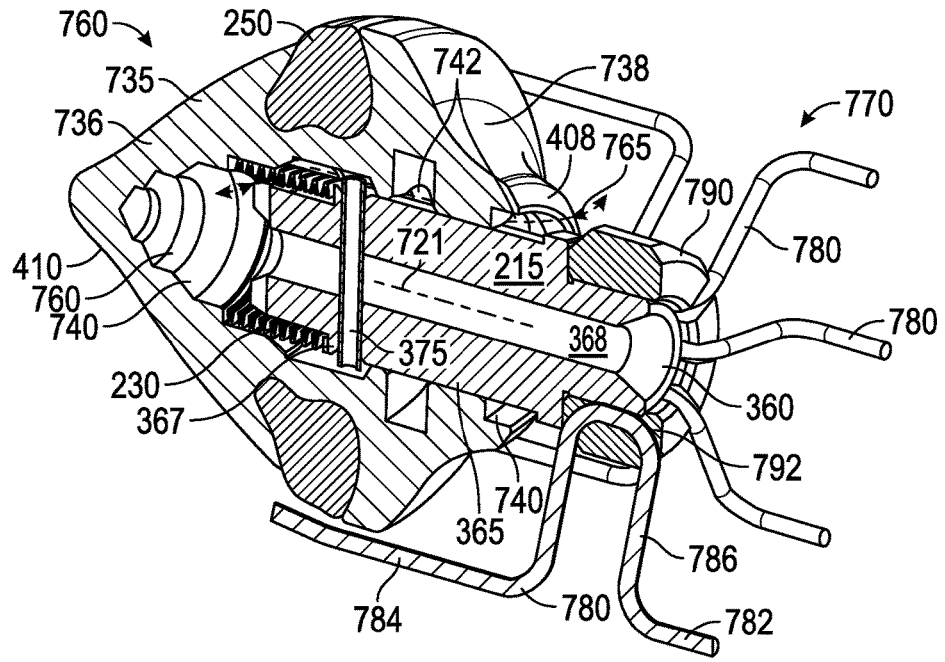
FIG. 15 is a rear perspective view of the suction valve assembly of FIG. 14 in accordance with the principles disclosed herein.

Shown in FIG. 14 and FIG. 15, the suction valve assembly 720 includes an axial centerline 721, a poppet guide 215, an annular poppet spring 230, an annular valve seat 240, a hollow poppet 735, and a flexible poppet guide mounting system 770. The poppet guide 215, the annular poppet spring 230, and the valve seat 240 are similar to identically numbered features of suction valve assembly 145. For example, the poppet guide 215 includes a poppet guide base 360, a poppet guide stem 365, and an axial flowbore 368 extending through base 360 and stem 365. Distal the base 360, the guide stem 365 includes an annular ledge 367 facing away from base 360. A pin 375 extends radially through the guide stem 365 and partially blocks the axial flowbore 368.

Best depicted in FIG. 15, hollow poppet 735 includes a hollow head 736 and a tail end 738 extending therefrom. The hollow head 736 has a somewhat conically-shaped outer surface 410 with a seal 250 embedded therein. The tail end 738 includes a convex outer surface 408. In the exemplary embodiment, outer surfaces 408, 410 are similar to the identically numbered outer surfaces of poppet 235 (FIG. 6). As such, head 736 is configured to engage and seal against the valve seat 240. The poppet 735 includes a multi-featured recess 740 having multiple portions of differing diameters and extending inward from tail end 738. One or more axial channels 742 extend axially inward from the outer end of recess 740. In some embodiments, poppet 735 has six channels 742.

The recess 740 of poppet 735 receives the poppet guide stem 365 therein, defining an internal cavity 760 between the poppet guide stem 365 and the inner surface of the poppet 735. The distal end of guide stem 365 slidingly receives the poppet spring 230, which extends axially between annular ledge 367 and an internal face within the poppet recess 420. In the example shown, poppet spring 230 is an annular wave spring.

Continuing to reference FIG. 15, a poppet guide mounting system 770 couples to poppet guide 215 of suction valve assembly 720, for elastic response and support of poppet guide 215. The poppet guide mounting system 770 includes multiple extending support members 780 embedded within radially and axially extending channels 792 formed in a poppet guide nut 790. Poppet guide nut 790 is threadingly received on poppet guide 215 at the guide base 360. The support members 780 are circumferentially spaced around poppet guide 215. Each extending support member 780 includes an U-shaped intermediate section 786 with the two arms of the "U" extending radially outward from the two ends of nut 790. The support member 780 further includes a first leg 782 continuing from one arm of the intermediate section 786 and extending axially away from nut 790 in a direction opposite poppet guide 215. A second leg 784 of support member 780 continues from the other arm of the intermediate section 786 and also extends axially from nut 790 but extends alongside poppet guide 215, reaching past a portion of poppet head 736. In this embodiment, poppet guide mounting system 770 does not include a flexible pedestal assembly, such as flexible pedestal assembly 520 of FIG. 4. However, various other embodiments having a poppet guide mounting system 770 may also include a flexible pedestal assembly.

The suction valve assembly 720 further includes a fluid passage 765 extending from the outer surface 408 at tail end 738 of poppet 735, through the axial channels 722, alongside poppet guide 215, through poppet spring 230, and into internal cavity 760. Referring to FIG. 14, the fluid passage 765 provides fluid communication between pumping chamber 705 and internal cavity 760. Due to the mounting of poppet guide 215, which will be explained subsequently, the axial flowbore 368 also provides fluid communication between pumping chamber 705 and internal cavity 760 with pin 375 positioned to act as a fixed-area flow restrictor for fluid movement through the flowbore 368.

Referring to FIG. 13, the discharge valve assembly 820 includes an axial centerline 821, a poppet guide 215, an annular poppet spring 230, an annular valve seat 840, a hollow poppet 735, and a flexible poppet guide mounting system 500B. The poppet guide 215, the annular poppet spring 230, and the hollow poppet 735 are similar to identically numbered features of the suction valve assembly 720. The annular valve seat 840 includes features similar to the valve seat 240 of the suction valve assembly 720, including a converging inner surface adjoining a diverging inner surface; however, at least in the example embodiment, the outer diameter of valve seat 840 is larger than the outer diameter of valve seat 240 to facilitate positioning of the two poppet valve assemblies 720, 820 within internal cavity 702.

The poppet 735 of discharge valve assembly 820 receives poppet guide stem 365 of the poppet guide 215, defining an internal cavity 760 within a poppet recess 420. The guide stem 365 slidingly receives the poppet spring 230, which extends to an internal face within the poppet 735. The discharge valve assembly 820 further includes a fluid passage 765 extending from the outer surface at the tail end of poppet 735 and into internal cavity 760. (An example of fluid passage 765 is shown in FIG. 15.) The fluid passage 765 provides fluid communication between the internal cavity 760 and the portion internal cavity 702 that provides fluid communication with the discharge port 140.

A poppet guide mounting system 500B couples to poppet guide 215 of discharge valve assembly 820. Like the poppet guide mounting system 500 of suction valve assembly 145, mounting system 500B includes multiple extending support members 540 (FIG. 9 and FIG. 10) coupled to the poppet guide 215 (FIG. 14) coupled to a poppet guide nut 550 threadingly received on poppet guide 215 at the base 360. The support members 540 extend radially and axially from nut 550, and provide radial, axial, or both radial and axial elastic force response to elastically support adjacent components of the valve assembly.

Within the internal cavity 702 of the valve block 700, the suction valve assembly 720 is installed with its valve seat 240 in abutment against a shoulder adjacent the suction port 135 and with poppet guide 215 and mounting system 770 disposed on the opposite side of poppet 735 from the valve seat 240. The second legs 784 of the support members 780, which extend around a portion of poppet head 736, embed into the tail end of the valve seat 240. The suction valve assembly 720 is limited in radial movement by proximity or contact of the first legs 782 or the second legs 784 with the inner surface of the internal cavity 702. In addition, the first legs 782 of mounting system 770 embed into the leading end of valve seat 840 of discharge valve assembly 820. Various features of the discharge valve assembly 820 are disposed adjacent the tail end of valve seat 840 with the head of the poppet 735 extending through valve seat 840 towards suction valve assembly 720. The second legs 544 of the support members 540 extend around a portion of the corresponding poppet head 736 and embed into the tail end of the valve seat 840. The discharge valve assembly 820 is limited in radial movement by the proximity or contact of second legs 544 with the inner surface of the internal cavity 702. The base of a recess 711 within the retainer 710 engages the poppet guide base 360 of discharge valve assembly 820, limiting its movement in one axial direction. A radial clearance 835 between retainer recess 711 and poppet guide base 360 enables limited movement of the poppet guide 215 relative to the axial centerline 704.

Continuing to reference FIG. 14, the poppet guide 215 of suction valve assembly 720 is mounted or suspended within internal cavity 702 by extending support members 780, which provide radial and axial support. In various instances this base 360 may contact the head of poppet 735 of discharge valve assembly 820. The poppet guide 215 and the coupled poppet 735 of suction valve assembly 720 are configured to translate laterally, to translate axially, and to pivot relative to axial centerline 704 due, in part, to the resilient suspension and elastic response capabilities of the extending support members 780. Similarly, the poppet guide 215 and the coupled poppet 735 of discharge valve assembly 820 are configured to translate laterally, to translate axially, and to pivot relative to axial centerline 704 due, in part, to the resilient suspension and elastic response capabilities of the extending support members 540 and due to the radial clearance 835.

The operations of the suction valve assembly 720 and the discharge valve assembly 820 are generally similar to the operations described for poppet valve assemblies 145, 150. In the embodiment of FIG. 14, the independent movements of poppets 735 relative to their mating poppet guides 215 are potentially dampened by the restricted or limited flow areas within the respective fluid passages 765 as working fluid flows therethrough, traveling between the internal cavity 760 and the pumping chamber 705 or the discharge port 140. In addition, for suction valve 720, the axial flowbore 368 and pin 375 also allow restricted fluid communication between internal cavity 760 and pumping chamber 705 via poppet guide base 360, further promoting dampened movement of the poppet 735 relative to the mating poppet guide 215. For discharge valve assembly 820, in some instances, a sudden movement of poppet 235 toward poppet guide 215 may cause a pressure spike within internal cavity 760 and axial flowbore 368 sufficient to cause the fluid momentarily to push the poppet guide 215 away from the retainer 710. In such instances of hydraulic lifting, some fluid in flowbore 368 may pass between poppet guide base 360 and retainer 710, entering the pumping chamber 705.

Figure 16:
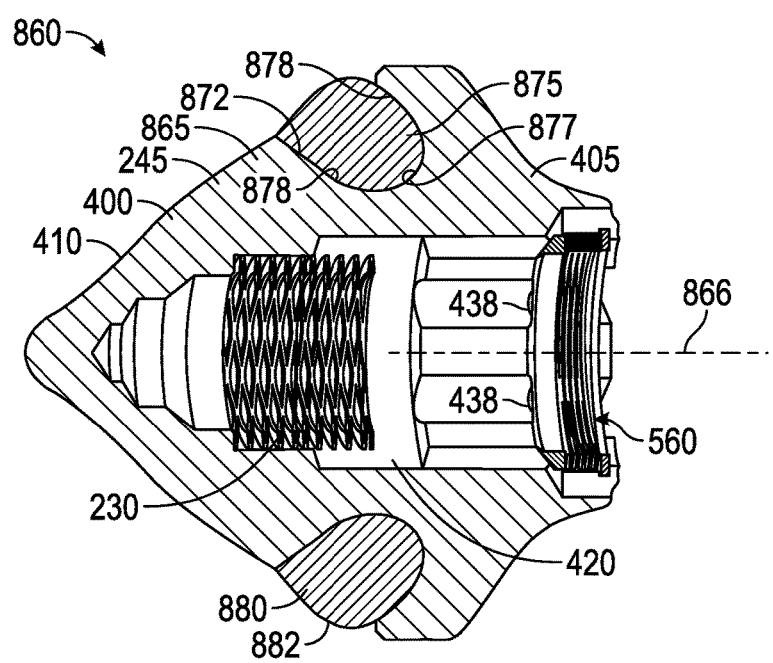
FIG. 16 is a profile cross-sectional view of a poppet sub-assembly compatible as a replacement for the poppet sub-assembly of the suction valve assembly of FIG. 4 in accordance with the principles disclosed herein.

Various embodiments consistent with the present disclosure have been presented. In addition, although various embodiments herein include a seal groove 415 and seal 250 having multi-lobular cross-sections, some other embodiments include a poppet having a more simple seal groove and a more simple seal held therein. The poppet sub-assembly 860 of FIG. 16 is an example of such an embodiment having different seal groove and seal. Poppet sub-assembly 860 may replace poppet sub-assembly 220 in suction valve assembly 145 of FIG. 3 and FIG. 4. As shown in FIG. 16, poppet sub-assembly 860 includes a poppet 865, an annular poppet spring 230, and a variable-area flow restrictor 560, both received within poppet 865. Spring 230 and flow restrictor 560 are the same as previously described. Poppet 865 includes an axial centerline 866 and includes many of the same features as poppet 235, such as a poppet body 245 with a hollow head 400 and an outer surface 410, an annular stem or tail end 405 extending from hollow head 400, and a multi-featured recess 420 having multiple portions and extending inward from tail end 405, for example. A plurality of variable gaps 438 are formed along the circumferential intersection of multi-featured recess 420 and the inner surface of variable-area flow restrictor 560. Poppet 865 further includes contoured surface 872 intersecting and extending radially inward from surface 410. Contoured surface 872 forms a circumferential seal groove 875. A seal 880 is received within groove 875. Seal groove 875 or contoured surface 872 has a concave end portion or region 877 distal poppet outer surface 410 and two flat, parallel side portions or side walls 878. Seal 880 is contoured to fill seal groove 875 and includes a protruding, convex outer surface 882 that extends radially beyond the outer surface 410 of poppet head 400 and seal groove 875, being configured to engage valve seat 240. Still other variations of a seal groove and a seal are also contemplated.

Considering FIG. 5 and FIG. 6 again, in an alternate embodiment of poppet 235, mutual face 430 does not intersect channels 426 in outer portion 425 of poppet recess 420. Instead, movable ring 570 of variable-area flow restrictor 560 is capable of sealing against mutual face 430 and inhibiting the direct passage of fluid between channels 436 and channels 426. However in this alternate embodiment, movable ring 570 may include advantageously directed boreholes that promote fluid flow between channels 436 and channels 426 even while ring 570 is sealed against mutual face 430. With these modified features, a fixed flow area is provided for fluid flow entering internal cavity 460 (FIG. 4) and a variable flow area is provided for fluid flow leaving internal cavity 460. The variable flow area is achieved by the movement of ring 570 away from mutual face 430. For operational reasons, it may be advantageous in various embodiments instead to provide a variable flow area for fluid flow entering internal cavity 460 and a fixed flow area for fluid flow leaving internal cavity 460, or to provide a variable flow area for fluid during entry and during exit from internal cavity 460.

As another example of a possible modification, a retainer and a poppet guide, such as retainer 602 and poppet guide 665 of suction valve assembly 600, are formed as an integral member in some embodiments.

As still another example, in various other embodiments, suction valve assembly 720 or discharge valve assembly 820 includes a poppet 235 and a variable-area flow restrictor 560 or a poppet 605 with a variable-area flow restrictor 640 in place of poppet 735.

In various embodiments of a hollow poppet, the multi-featured recess may have more or fewer portions than do the multi-featured recesses described above. In some embodiments, the multi-featured recess of a hollow poppet may be replaced by a straight bore recess and one or more annular inserts. The one or more annular inserts would have an outer diameter appropriate to slide within the straight bore recess and would have various inner diameters to achieve the functionality of one of the multi-featured recesses described herein.

While various embodiments have been shown and described, modifications thereof can be made by one skilled in the art without departing from the spirit and teachings herein. The embodiments herein are exemplary only, and are not limiting. Many variations and modifications of the apparatus disclosed herein are possible and within the scope of the invention. Accordingly, the scope of protection is not limited by the description set out above, but is only limited by the claims which follow, that scope including all equivalents of the subject matter of the claims.

What is claimed is:

1. A valve assembly for operation within a valve body of a pump, the valve assembly comprising:
   an axial centerline;
   a poppet guide having a base and a stem;
   a poppet slidingly coupled to the poppet guide, wherein the poppet and the poppet guide define an internal cavity;
   a flexible poppet guide mounting system coupled to the poppet guide and the poppet, the flexible poppet guide mounting system comprising support members coupled to the poppet guide base and extending therefrom to support the poppet guide and the poppet for lateral and axial movement of the poppet guide and the poppet relative to the axial centerline; and
   a variable-area flow restrictor comprising a resilient member in fluid communication with the internal cavity;
   wherein the poppet is movable relative to the poppet guide to adjust the volume of the internal cavity.

2. The valve assembly of claim 1 wherein the poppet comprises:
   a poppet body having a poppet head and an annular seal groove in the poppet head; and
   an elastic seal disposed within the seal groove, the seal comprising a first annular protrusion that extends beyond the seal groove and an annular recess adjacent the first annular protrusion.

3. The valve assembly of claim 2 wherein the seal further comprises a second annular protrusion, and wherein the annular recess is disposed between the first and second annular protrusions.

4. The valve assembly of claim 1 wherein the variable-area flow restrictor comprises a spring coupled adjacent the hollow poppet forming a portion of a fluid passage between the internal cavity and an outer surface of the valve assembly.

5. The valve assembly of claim 4 wherein the spring is coupled between the poppet and the poppet guide.

6. The valve assembly of claim 1 further comprising a fluid passage between the internal cavity and an outer surface of the valve assembly to provide the fluid communication, wherein the variable-area flow restrictor is configured to adjust a flow area of the fluid passage thereby providing a variable flow area for a first fluid flow leaving the internal cavity.

7. The valve assembly of claim 6 wherein the variable-area flow restrictor is further configured to provide a fixed flow area for a second fluid flow entering the internal cavity.

8. A valve assembly for operation within a valve body of a pump, the valve assembly comprising:
  an axial centerline;
  a poppet guide;
  a flexible poppet guide mounting system engaging the poppet guide and configured to elastically support the poppet guide and elastically respond to lateral and axial movement of the poppet guide relative to the axial centerline, wherein the flexible poppet guide mounting system comprises a plurality of extending support members coupled to the poppet guide and extending radially and axially from the poppet guide, and wherein the poppet guide mounting system further comprises a poppet guide not having a plurality of channels receiving the plurality of extending support members, wherein the nut is threadingly received by the poppet guide; and
  a poppet slidingly coupled to the poppet guide and movable with the poppet guide.

9. The valve assembly of claim 8 wherein the extending support members extend around a portion of the poppet.

10. The valve assembly of claim 8 wherein the extending support members extend axially in two directions from a region where the extending support members couple to the poppet guide.

11. The valve assembly of claim 8 wherein the poppet comprises a poppet recess receiving an end of the poppet guide therein.

12. The valve assembly of claim 11 wherein the poppet guide comprises an annular ledge facing the poppet recess, and wherein a poppet spring is slidingly received by the poppet guide and extends between the annular ledge and an internal face of the poppet recess.

13. The valve assembly of claim 11 further comprising a fluid passage extending from the poppet recess through a variable-area flow restrictor, wherein the fluid passage is in fluid communication with an outer surface of the valve assembly, and wherein the variable-area flow restrictor is configured to adjust a flow area of the fluid passage.

14. A valve assembly for operation within a valve body of a pump, the valve assembly comprising:
  an axial centerline;
  a poppet guide;
  a flexible poppet guide mounting system engaging the poppet guide and comprising elastic support members extending therefrom to elastically support the poppet guide and elastically respond to lateral and axial movement of the poppet guide relative to the axial centerline;
  a poppet slidingly coupled to the poppet guide and movable with the poppet guide; and
  a retainer with a retainer recess into which the poppet guide extends, and a clearance between the retainer and the poppet guide enabling movement of the poppet guide about the axial centerline.

15. The valve assembly of claim 14 further comprising:
  a supporting spring disposed within the retainer recess; and
  a support ring disposed within the retainer recess adjacent the supporting spring;
  wherein the poppet guide is disposed against the support ring enabling movement of the poppet guide about and along the axial centerline.

16. The valve assembly of claim 15 wherein the retainer recess comprises a multi-featured recess having a first recess portion in which the supporting spring is seated and a second recess portion within which the support ring and the poppet guide are received, wherein the second recess portion has a larger diameter than the first recess portion, and wherein the supporting spring extends into the second recess portion.

17. The valve assembly of claim 16 further comprising:
  a snap ring coupled to the retainer adjacent the support ring and opposite the supporting spring;
  a base plate between the supporting spring and the end of the retainer recess;
  a set screw threadingly received by a hole passing through the end of the retainer recess;
  wherein the set screw is configured to urge the base plate away from the end of the retainer recess and to cause the base plate to apply pressure against the supporting spring and the support ring to urge the poppet guide away from the end of the retainer recess;
  wherein the snap ring limits the axial travel of the support ring in a direction away from the end of the retainer recess; and
  wherein a ledge between the first and second recess portions of the retainer recess limits the axial travel of the support ring and the poppet guide in a direction toward the end of the retainer recess.

18. The valve assembly of claim 15 further comprising a fluid cavity within the retainer recess, the fluid cavity bounded by a base of the poppet guide, the support ring, and the retainer recess, wherein the poppet guide has an axial flowbore extending therethrough, wherein a flow restrictor is disposed in the axial flowbore, and wherein the axial flowbore is in fluid communication with the fluid cavity and an outer surface of the valve assembly.

19. A valve assembly for operation within a valve body of a pump, the valve assembly comprising:
  a poppet guide having a stem;
  a hollow poppet receiving the poppet guide stem therein, wherein the poppet and the poppet guide define an internal cavity and an annular space between the poppet and the poppet guide that is in fluid communication with the internal cavity; and
  a variable-area flow restrictor comprising an expandable resilient member coupled into and retained in the annular space between the poppet and the poppet guide;
  wherein the hollow poppet is movable relative to the poppet guide to adjust the volume of the internal cavity; and
  a poppet spring disposed within the hollow poppet and surrounding the poppet guide, the poppet spring spaced apart from the variable-area flow restrictor and biasing the hollow poppet in a direction away from the poppet guide.

20. The valve assembly of claim 19 wherein a fluid passage extends from the internal cavity through the annular space and the variable-area flow restrictor, wherein the fluid passage is in fluid communication with an outer surface of the valve assembly, and wherein the variable-area flow restrictor is configured to adjust a flow area of the fluid passage.

21. The valve assembly of claim 19 wherein the variable-area flow restrictor comprises:

a retention ring attached to the valve assembly;
a regulating spring having an end adjacent the retention ring; and
a movable ring disposed between the regulating spring and an inner contact surface of the valve assembly and being in fluid communication with the internal cavity;
wherein the regulating spring biases the movable ring towards the inner contact surface of the valve assembly.

22. The valve assembly of claim 21 wherein the hollow poppet comprises a tail end and a multi-featured recess forming at least a portion of the internal cavity, the multi-featured recess comprising:
an outer portion proximal the tail end;
a transitional portion adjoining the outer portion at a mutual face; and
a base portion adjoining the transitional portion;
wherein the variable-area flow restrictor is disposed in the outer portion of the multi-featured recess with the retention ring attached proximal the tail end and the movable ring biased by the regulating spring to contact the mutual face; and
wherein the hollow poppet and the variable-area flow restrictor slidingly receive the poppet guide stem.

23. The valve assembly of claim 22 wherein the mutual face adjoining the transitional portion and the outer portion is frustoconical, and wherein the movable ring of the variable-area flow restrictor comprises a frustoconical face positioned to contact the mutual face.

24. The valve assembly of claim 23 wherein the outer portion of the multi-featured recess comprises a fluid passage comprising an axial channel intersecting the mutual face;
wherein the fluid passage extends through the base portion and the transitional portion of the multi-featured recess, past the mutual face, and to an outer surface of the valve assembly;
wherein the fluid passage has a reduced flow area at the mutual face when the movable ring contacts the mutual face; and
wherein the fluid passage has a flow area at the mutual face that is larger than the reduced flow area when the movable ring moves away from the mutual face.

25. The valve assembly of claim 24 further comprising a second variable-area flow restrictor in fluid communication with the internal cavity and comprising a poppet spring disposed within the hollow poppet and surrounding the poppet guide, the poppet spring biasing the hollow poppet in a direction away from the poppet guide.

26. The valve assembly of claim 19 wherein the poppet guide stem has an axial flowbore extending therethrough, wherein a flow restrictor is disposed in the axial flowbore, and wherein the axial flowbore is in fluid communication with the internal cavity, the variable-area flow restrictor, and an outer surface of the valve assembly.

27. The valve assembly of claim 19 further comprising:
a retainer having a retainer recess within which the poppet guide is received;
a retention member coupled to the retainer and disposed adjacent the retainer recess and the poppet guide;
a supporting spring disposed within the retainer recess; and
a support ring disposed within the retainer recess between the retention member and the supporting spring;
wherein the support ring supports a base of the poppet guide and is biased by the supporting spring in a direction away from the retainer.

28. The valve assembly of claim 27 further comprising a fluid cavity within the retainer recess, the fluid cavity bounded by a base of the poppet guide, the support ring, and the retainer recess, wherein the poppet guide stem has an axial flowbore extending therethrough, and wherein the axial flowbore is in fluid communication with the fluid cavity, the internal cavity, the variable-area flow restrictor, and an outer surface of the valve assembly.

29. The valve assembly of claim 19 wherein the poppet guide further comprises a base from which the poppet stem extends and a plurality of extending support members, and wherein the plurality of extending support members is coupled to the base of the poppet guide and extends radially and axially therefrom.

30. A valve assembly for operation within a valve body of a pump, the valve assembly comprising:
a poppet guide having a stem;
a hollow poppet receiving the poppet guide stem therein, wherein the poppet and the poppet guide define an internal cavity and an annular space between the poppet and the poppet guide that is in fluid communication with the internal cavity; and
a variable-area flow restrictor comprising an expandable resilient member coupled into and retained in the annular space between the poppet and the poppet guide;
wherein the hollow poppet is movable relative to the poppet guide to adjust the volume of the internal cavity;
wherein the hollow poppet comprises a hollow head and a tubular stem extending therefrom;
wherein the poppet stem receives the poppet guide stem therein;
wherein the poppet stem has a radial port extending therethrough and an internal axial channel extending from the internal cavity to the radial port;
wherein the variable-area flow restrictor is aligned with the radial port; and
wherein the internal cavity, the axial channel, the radial port, and the variable-area flow restrictor are configured for fluid communication.

31. The valve assembly of claim 30 wherein the variable-area flow restrictor comprises a wave spring received around the poppet stem and retained by an end nut.

32. A pump comprising:
a valve body;
a valve cavity disposed in the valve body;
a first valve assembly disposed within the valve cavity, the first valve assembly comprising:
a poppet guide having an elongate stem extending axially from a base;
a hollow poppet slidingly receiving the poppet guide stem therein, wherein the poppet and the poppet guide define an internal cavity and a fluid passage between the poppet and the poppet guide; and
a resilient member coupled into and retained in the fluid passage and providing a variable-area flow restriction in the fluid passage for fluid communication between the internal cavity and the valve cavity;
wherein the hollow poppet is movable relative to the poppet guide to adjust the volume of the internal cavity; and
a poppet spring disposed within the internal cavity and spaced apart from the resilient member, the poppet spring biasing the hollow poppet in a direction away from the poppet guide.

33. The pump of claim 32 wherein the poppet comprises:
a poppet body having a poppet head and an annular seal groove in the poppet head; and an elastic seal partially disposed within the seal groove, the seal comprising a first annular protrusion that extends beyond the seal groove and an annular recess adjacent the first annular protrusion.

34. The pump of claim 32 wherein the seal further comprises a second annular protrusion adjacent the outer surface of the poppet, and wherein the annular recess is disposed between the first and second annular protrusions.

35. The pump of claim 34 wherein the second annular protrusion extends beyond the seal groove.

36. The pump of claim 32 further comprising a second valve assembly co-axially aligned with the first valve assembly and disposed within the same valve cavity.

* * * * *